(12) United States Patent
Minkin

(10) Patent No.: US 7,027,063 B1
(45) Date of Patent: *Apr. 11, 2006

(54) TEXTURE CACHE ADDRESSING

(75) Inventor: Alexander L. Minkin, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/123,657

(22) Filed: May 6, 2005

Related U.S. Application Data

(63) Continuation of application No. 09/712,632, filed on Nov. 13, 2000, now Pat. No. 6,924,811.

(51) Int. Cl.
*G06T 17/00* (2006.01)

(52) U.S. Cl. ........................ 345/552; 345/557; 345/582; 345/587; 711/3

(58) Field of Classification Search ................ 345/552, 345/557, 587, 582; 711/3, 118
See application file for complete search history.

(56) References Cited

U.S. PATENT DOCUMENTS 6,636,225 B1 * 10/2003 Alcorn et al. ................ 345/552

* cited by examiner

*Primary Examiner*—Ulka Chauhan
*Assistant Examiner*—Mackly Monestime
(74) *Attorney, Agent, or Firm*—Townsend and Townsend and Crew LLP; Matthew Zigmant

(57) ABSTRACT

A method of storing a texel in a texel cache comprising reading a t coordinate of the texel, the t coordinate comprising a plurality of bits, reading a s coordinate of the texel, the s coordinate comprising a plurality of bits, forming an offset by concatenating bits of the t coordinate with bits of the s coordinate and forming an index by concatenating bits of the t coordinate with bits of the s coordinate and at least one bit of a level of detail is discussed.

20 Claims, 24 Drawing Sheets

DIRECT MAPPING

FULLY ASSOCIATIVE

2-WAY SET ASSOCIATIVE

TEXTURE CACHE ADDRESSING

This application is a continuation of U.S. patent application Ser. No. 09/712,632, filed Nov. 13, 2000, now U.S. Pat. No. 6,924,811 which is incorporated by reference. This application is related to U.S. patent application Ser. No. 09/712,383, filed Nov. 13, 2000, which is incorporated by reference.

BACKGROUND

The present invention relates to methods and apparatus for addressing cache lines in a graphics system.

The sophistication of the market for computer and video graphics and games has exploded over the last few years. The time when simple games such as "Pong" was a marketable product is far in the past. Today's garners and computer users expect realistic three dimensional (3-D) images, whether the images are of a football game, race track, or new home's interior. Accordingly, this appetite has focused designers' efforts to improving the graphics systems in computers and video game systems.

Increasing the realism of video requires a higher screen resolution as well as displaying items as 3-D contoured objects, rather than simple two dimensional (2-D) pictures. These 3-D objects can be separated into 3-D shapes covered by a 2-D or 3-D texture.

A monitor's maximum resolution is set by the number of pixels on its screen. In color monitors, each pixel is made up of a red, green and blue "dot" in close proximity to one another. By varying the intensity of the "dots", the color and brightness of the pixel can be changed. The more pixels on a screen, the more realistic an image will appear. For example, if a typical tire on a race car is represented on the screen by one pixel, that pixel will be black. A single black spec on a screen would not make for a very impressive tire. If however, the tire is represented by many pixels, then details such as shape, hub caps, lug nuts can be seen, and the image is more convincing. To add a further degree of realism, a texture, for example tire tread, can be added. Where the rubber meets the road, a texture of asphalt may be used.

These textures are stored in memory, and are retrieved as required by the graphics system. They may be two dimensional or three dimensional. Two dimensional textures are two dimensional images, and the dimensional coordinates are typically labeled either s and t, or u and v. In systems using a conventional bilinear filter, four pieces of texture information, referred to as texels, are used to determine the texel value, which is the texture information for one pixel. 16 bits is a common size for each texel. Alternately, texels may be 4, 8, 32, or any other integral number of bits in size. Three dimensional textures are sets of two dimensional textures, and the coordinates are usually labeled s, t, and r. Trilinear filtering is common in systems supporting three dimensional textures, and uses 8 texels to determine the texture information for one pixel.

This means that a huge amount of information is needed to supply the texture information for a video image. For example, a conventional monitor screen having a resolution of 1280 by 1024 pixels with a refresh rate of 75 Hz requires about 100M pixels per second of information. Since four texels of 16 bits are used for each pixel, such a system operates at 6,400M bits per second, or 800M bytes of data per second.

This texel information is stored in memory for fast access by the graphics controller. Preferably it would all be stored in memory on the same chip as the other elements of the graphics system, using a fast type of circuitry, such as static random access memory (SRAM). However, SRAMs tend to take up a large amount of die area, and require a lot of power, so cost of this is prohibitive.

A conventional solution to the problem of making a fast but cost effective memory is to use a type of architecture known as a memory hierarchy. The concept behind memory hierarchy is to use a smaller amount of SRAM, preferably on-chip, and have a larger memory off-chip using less expensive circuitry, such as dynamic random access memory (DRAM). This way, some of the data needed quickly by the graphics controller is readily available in the on-chip fast SRAM, while the bulk of the data waits in the DRAM. If the controller needs data that is not available in the SRAM, it can pull the data from the DRAM and overwrite existing data in the SRAM. In this type of system, the SRAM is known as the cache, and the DRAM is the main memory.

FIG. 1 is a block diagram of one such conventional system. CPU 100 can access data directly from cache memory 110. If the required data is not present, a copy of it is moved from the main memory 120, to the cache memory 110. Extra capacity and storage when the system is powered down is provided by an input output device such as a disk 130. Each element of the memory hierarchy from left to right has a slower access time, but has a lower cost of storage per bit. In this way a system may be optimized in terms of both access time and cost.

There are two methods by which data in the DRAM is written into cache. These are referred to as direct and associative. In direct mapped, a portion of a main memory frame address of a block of data is used in determining the location in cache where that data may be placed. Each block of data in the main memory has one location in cache where it may be placed. This method has the benefit of the simplicity that once a block's main memory address is known, the location of where it may be placed in cache is also known.

The associative method comes in two varieties. In the fully associative method, a block of data, also known as a cache line, can be placed anywhere in cache. In a fully associative cache, no portion of the memory address is used to identify the cache line. This has the advantage of being very flexible, but requires a great deal of fast circuitry to keep track of the location of each data block. For example, when attempting to access a texel in cache, the tag for that texel must be compared against the tags for each cache line. In the direct method, since a texel can be placed in only one cache line, only one tag must be compared. Tags are explained more fully below.

A compromise between the direct and fully associative methods is n-way associativity. For example, in 2-way associativity, a block of data may be written into one of two locations in cache. In n-way associativity, there is the advantage that a block in the main memory may be written into more than one location in cache. Furthermore, not all cache line tags need to be compared when looking for a texel, rather n tags must be checked.

FIGS. 2A, 2B, and 2C show a symbolic representation of a main memory 200 and cache 210. The main memory 200 has 12 block frame addresses 0–11, the cache has 4 cache lines, labeled 0–3. There are many individual data locations at each block frame address in main memory 200. In the direct mapped cache shown in FIG. 2A, data at block frame address 0 in the main memory can only be stored in cache line 0. Since 4 mod 4 and 8 mod 4 both equal 0, data at those main memory block frame addresses can only be stored in cache line 0. In the fully associative cache shown in FIG. 2B, data from any block frame address in main memory 220 may be stored in line 0 of the cache 230. Similarly, data in block 0 in the main memory 220 may be written into any cache line in cache 230. There is more freedom as to where data may be cached with this method, but there is a price to be paid for the extra circuitry that is required to keep track of where data is stored. A trade off between flexibility and complexity is achieved with the set associative method illustrated in FIG. 2C. Cache 250 is divided into two sets 260, labeled 0 and 1. Data residing at block frame addresses 0, 4, and 8 of the main memory 240 may be stored anywhere in set 0. Similarly, data in block 0 of the main memory 220 may be written into any cache line in cache line set 0, that is either cache line 0 or cache line 1.

In a set associative system, the main memory address of a piece of data is broken up into sections and used by different circuits in order to locate that piece of data. The address is first split into the block address and block offset, with the least significant bits (LSBs) being the block offset. The block address may be further subdivided into tag and index fields, with the tag being the most significant bits (MSBs). The offset specifies the location of the data within a cache line, the index identifies the set number in cache, and the tag is used to determine whether the required block is in cache.

A specific example using a 2-way set associative architecture is shown in FIG. 3. Main memory 300 has 12 block frames with addresses 0–11 (310). Each frame holds 4 addresses 320. A particular location 370 has address 010010. The four MSBs, 0100 is the binary equivalent of 4, which is the frame address 310. The two LSBs 10 are the binary equivalent of 2, which is the offset of the particular location. In this example, the offset 380 is 2, so it is known that if the data is in cache, it is in location 2 in a cache line. The index 385 is 0, so the data must be in set 0 of the cache 330. In this example, we know from FIG. 2 above that data from block frame addresses 0, 2, 4, 6, 8, and 10 may be stored in cache set 0. These block frame addresses all have an index of 0, and have tags 000, 001, 010, 011, 100, and 101 respectively.

If the cache manager requires the data at location 010010, it can find it by looking at the index 385 which is 0, going to set 0 of cache 330, reading the tag 010 (the three MSBs) 390 and checking it against all the tags in set 0. If tag 010 is present, a cache hit has occurred, and the required data can be found at address 2, which is the offset 380 of the data. If tag 010 is not present, a cache miss has occurred, and the data must be fetched from the main memory 300 and written into cache 330.

In order to take full advantage of the speed of the cache memory, it is important to keep required data in cache, and to keep unused data out. An unfortunate condition can otherwise occur where after data is overwritten by a cache update, the overwritten data must be retrieved from memory and placed back into cache. This is known as thrashing, and will reduce the effective cache speed towards that of the DRAM. In other words, if data in cache is used only once before being replaced, there is no need for a cache, and the system operates as if there is only the DRAM.

To avoid thrashing, designers use the concepts of temporal and spatial locality. In temporal locality the notion is that recently used data is more likely than other data to be used again. This is the motivation for least recently used (LRU) systems. In an LRU system, a cache manager will check the blocks in cache where a new data block from the main memory may be written. The block in cache that is the least recently used is the one chosen to be overwritten. Spatial locality says that data at an address next to an address that has been recently used is more likely than other data to be used, and should therefore not be overwritten by new data.

As discussed above, high end graphics systems require access to amounts of data in the range of 800M bytes per second. A good use of a memory hierarchy architecture can help make this task manageable. Since so much data is required to generate realistic images for the latest generation of computer and video games and graphics, it is very desirable to improve cache efficiency and reduce the number of cache misses.

SUMMARY

Embodiments of the present invention use new types of locality to improve cache line addressing in order to reduce the number of cache misses.

Specifically, a method of storing a texel in a texel cache comprising reading a t coordinate of the texel, the t coordinate comprising a plurality of bits, reading a s coordinate of the texel, the s coordinate comprising a plurality of bits, forming an offset by concatenating bits of the t coordinate with bits of the s coordinate and forming an index by concatenating bits of the t coordinate with bits of the s coordinate is discussed.

A further embodiment of the present invention including an integrated circuit having a texture cache subsystem for storing texels, a cache address generator subsystem for receiving s and t coordinates, which provides an index and offset to the texture cache subsystem is also detailed. The integrated circuit also has a graphics pipeline subsystem which provides the s and t coordinates to the cache address generator subsystem, and memory addresses to the cache address generator subsystem, and further for receiving texels from the texture cache subsystem, wherein the index and offset comprise bits of the s and t coordinates.

A method of generating a texture cache address which includes reading an s coordinate of a texture, wherein the s coordinate comprises a plurality of bits, passing lower order bits of the s coordinate as a portion of an offset, passing middle order bits of the s coordinate as a portion of an index, and passing high order bits of the s coordinate as a portion of a tag is also discussed.

This method may further include reading a t coordinate of the texture, wherein the t coordinate comprises a plurality of bits, passing lower order bits of the t coordinate as a portion of an offset, passing middle order bits of the t coordinate as a portion of an index, and passing high order bits of the t coordinate as a portion of a tag.

DESCRIPTION OF EXEMPLARY EMBODIMENTS

Graphics Subsystem

Figure 1:
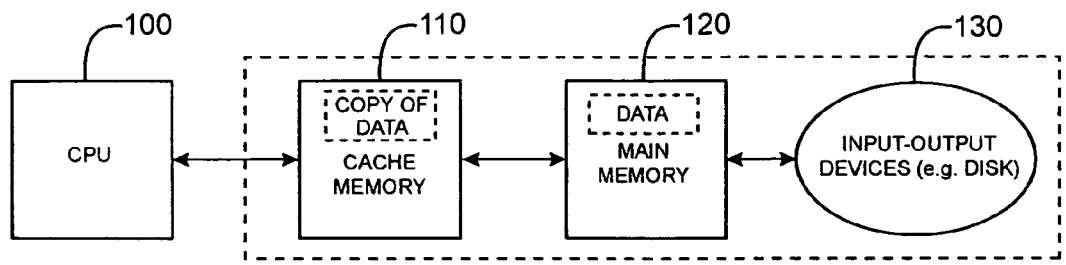
FIG. 1 is a block diagram of a conventional memory hierarchy architecture.
Figure 4:
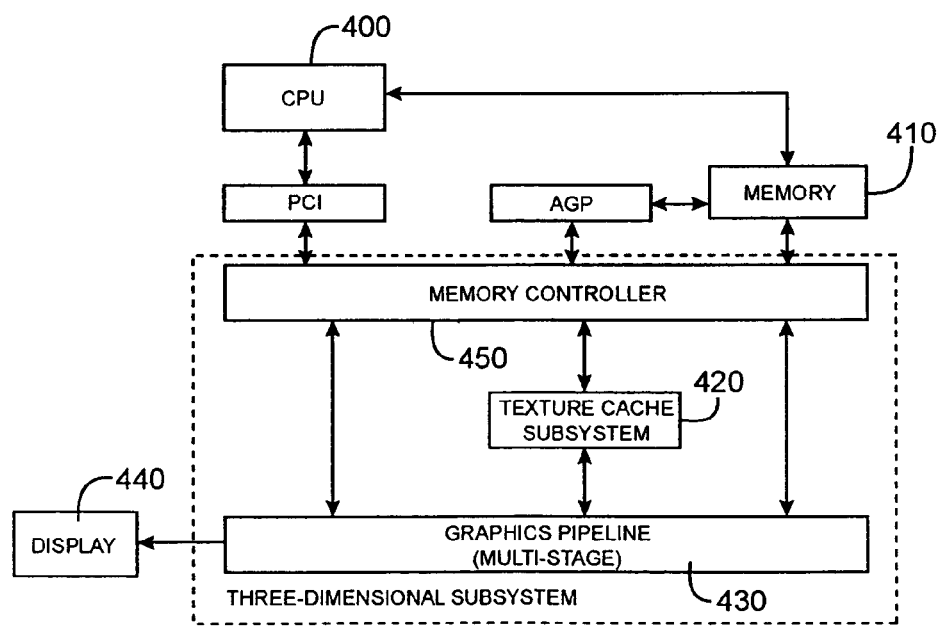
FIG. 4 illustrates one embodiment of a graphics subsystem consistent with the present invention.
Figure 2A:
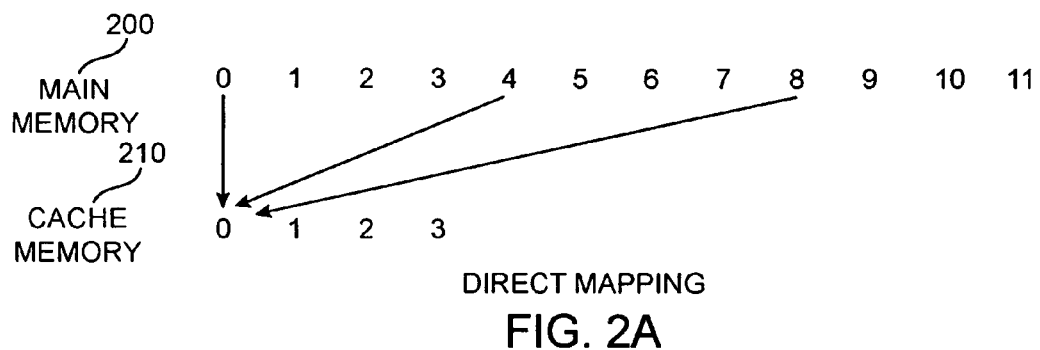
FIGS. 2A, 2B, and 2C are a symbolic representations of three conventional methods of writing to a cache.
Figure 2B:
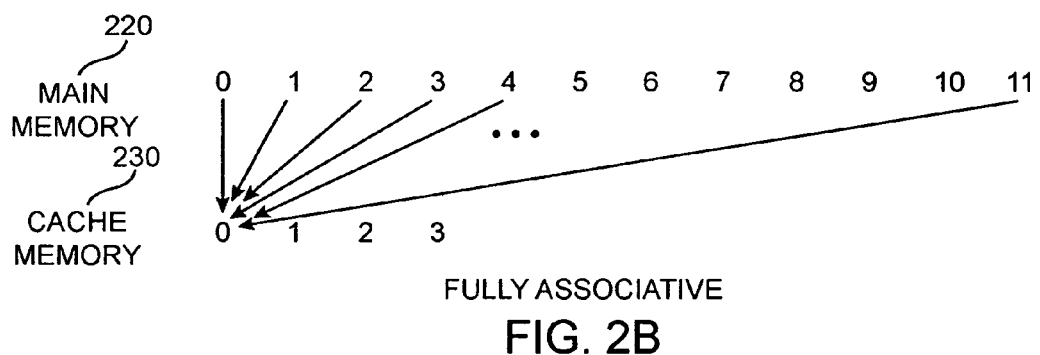
Figure 2C:
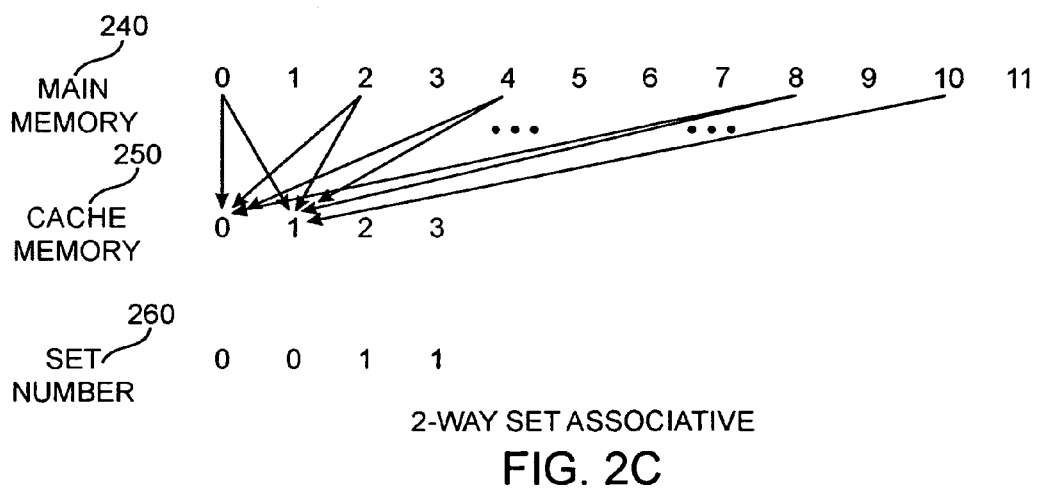
Figure 3:
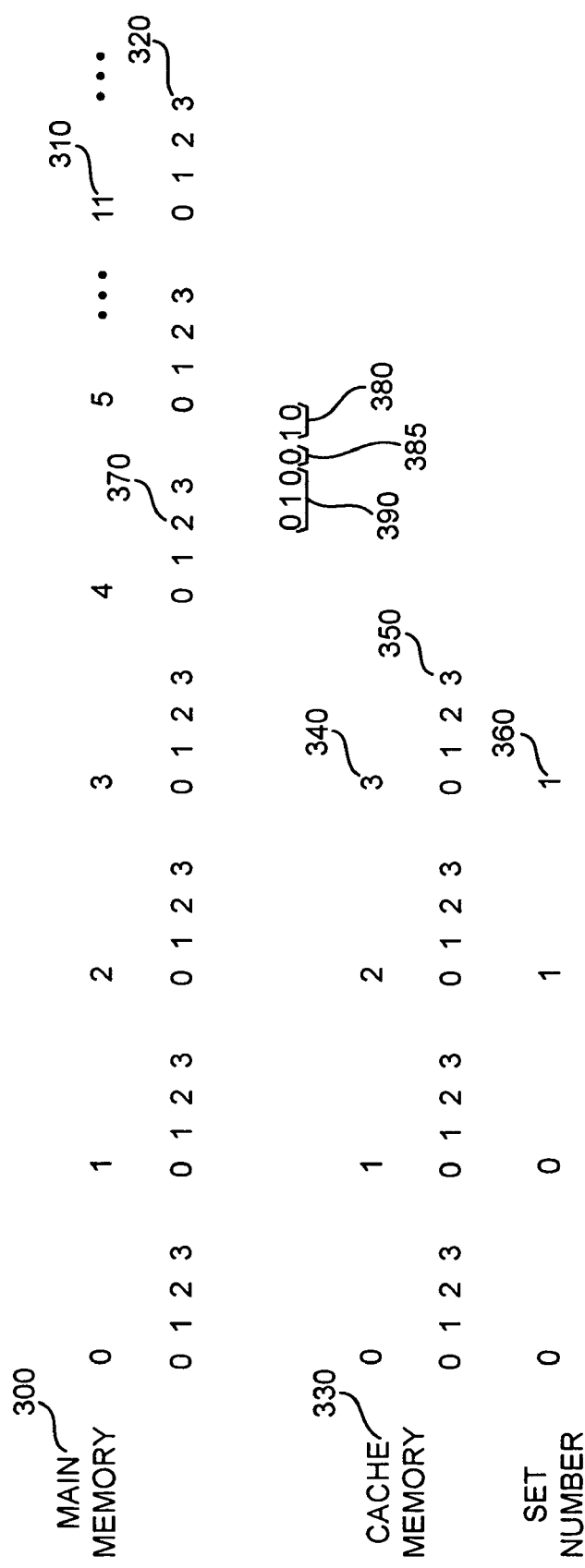
FIG. 3 shows a conventional addressing scheme for a cache memory.

FIG. 4 illustrates one embodiment of a graphics subsystem consistent with the present invention. The graphics subsystem includes a graphics pipeline 430, a display 440, a central processing unit (CPU) 400, a main memory 440, a memory controller 450, and a texture cache subsystem 420. The main memory 410 has a number of storage elements, and a set of these elements holds a two dimensional texture image. Graphics pipeline 430 uses the textures in memory 410 to display surface detail such as texture and shading on objects in the image on display 440. Specifically, graphics pipeline 430 receives graphics primitives and other data from the CPU via memory controller 450. The data used by the graphics pipeline 430 includes the vertices of triangles, each vertex being specified by x, y, and z coordinates, R, G, B color data, and s and t (or s, t, and r) texture coordinates. During the processing of this data, graphics pipeline 430 provides addresses of required texels to, and receives the required texels from the texture cache subsystem 420. The graphics pipeline performs the functions of geometry processing, fragment generation, hidden surface removal, and frame buffer display.

Cache Line Architecture

Figure 5A:
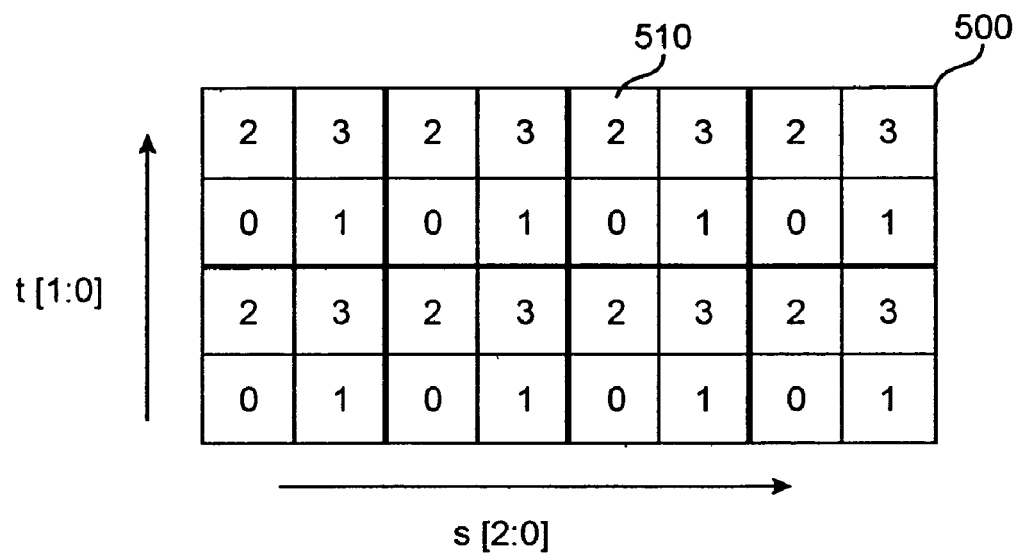
FIGS. 5A and 5B illustrate two cache lines, one having storage elements for 32 texels, the other 16.
Figure 5B:
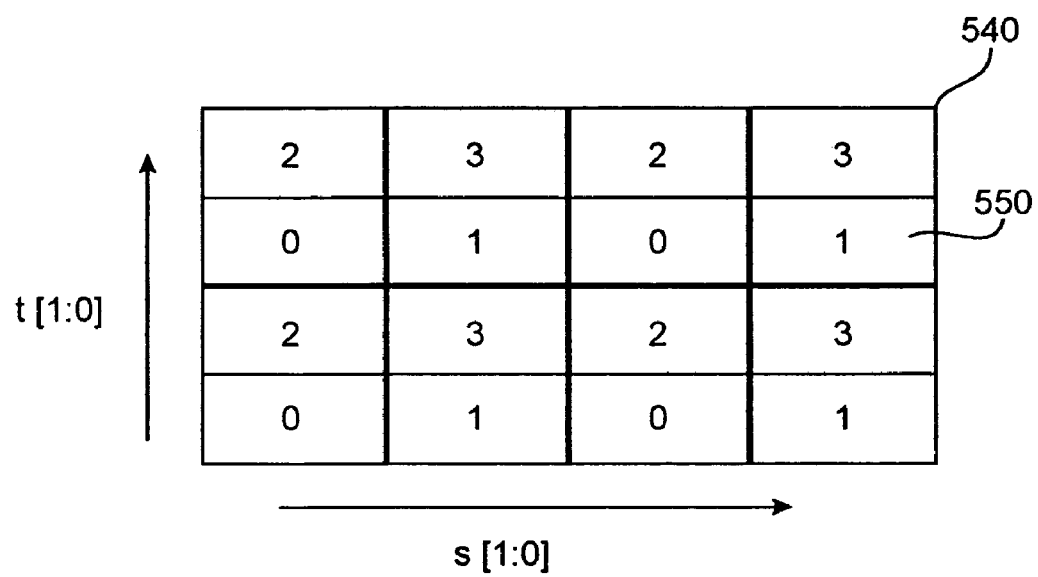

In one embodiment of the present invention, texture cache subsystem 420 uses a novel measure of locality to store texels received from memory 410 which are to be provided to the graphics pipeline 420. Using this measure of locality ensures that two pieces of the texture from memory 410 that are close to each other do not overwrite one another. This reduces the likelihood of thrashing in the cache. One measure of locality which is used by an exemplary embodiment of the present invention is shown in FIGS. 5A and 5B. In the example shown in FIG. 5A, a block in the cache, cache line 500, is arranged as a 4 by 8 array of texels. The location of each texel 510 stored in cache line 500 is identified by the offset. In this embodiment, the offset is determined by lower order bits of the s and t coordinates. As one example, the lower three bits of the s coordinate are concatenated with the lower two bits of the t coordinate, making a 5 bit offset value. Two to the power of 5 is 32, thus the offset uniquely identifies each of the 32 texels in the cache line 500. In the example shown in FIG. 5B, cache line 540 is arranged in a four by four array of texels. In this case only 4 bits of the s and t coordinates are required for the offset, so the lowest two bits of each are used. Different arrangements are possible, FIG. 5 shows two for purposes of illustration, and is not intended to limit the claims below. In one embodiment of the present invention, four memory banks are used to form the cache line 500. Each texel labeled 0 exists in one memory bank; similar banks are used for those texels labeled 1, 2 and 3. In this example, the LSBs s[0] and t[0] of the s and t coordinates are concatenated to determine the identity of the banks 0–3 containing the texel. The use of four memory banks allows access of four texels simultaneously. Such access to four adjacent texels is useful in addressing a quad of texels, as will be described below.

The number of storage elements in cache line 500 affect performance of the cache in the following manner. As the number of elements is increased, less of the data in the cache line is used before the line is overwritten, thus lowering the efficiency of the cache. As the number of elements is reduced, there are more cache lines for a given cache size. This means there are more cache line states to remember, requiring more circuitry. There is therefore an optimum size of the cache. One embodiment uses 32 texels, and each texel is 2 bytes in size for 64 bytes total. This size may be chosen for a system wherein the burst size of the main memory is 64 bytes. Other sizes may be chosen consistent with the present invention. In this embodiment, the texels to be stored are selected from a rectangular or square area of a texture in memory. Selecting the texels from a two dimensional area allows the lower order bits of the s and t coordinates to be used for the offset. Assuming the probability of accessing texels is equal in all directions, the two dimensional array using both s and t coordinates, as opposed to accessing texels in a straight line, reduces the number of cache updates needed. It is preferred that the array be square, that is the number of s and t bits used in the offset are equal, or nearly so. For example, the number of s and t bits used may differ by one or two.

Cache Line Allocation

Figure 6:
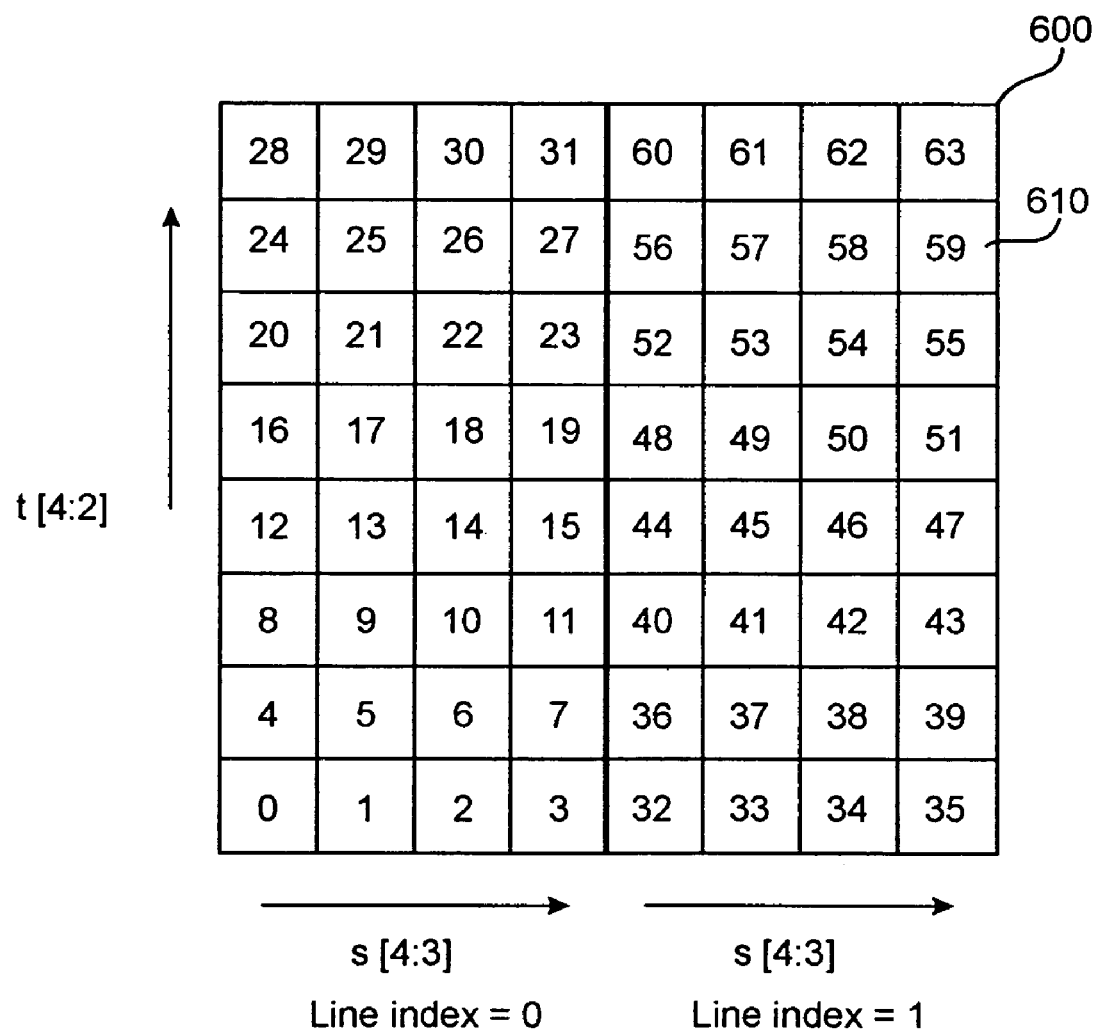
FIG. 6 illustrates a texture cache having two sets of 32 lines.

The cache lines in the cache memory may be arranged in a similar manner, alternately or in combination with the above. FIG. 6 shows an example of one such allocation of cache lines 610 in cache memory 600. This figure illustrates a 2-way set associative cache memory. This arrangement allows the use of one bit per pair of cache lines to indicate which of the two cache lines is the least recently used (LRU). In this way, a degree of temporal locality may be included in the cache storage scheme. As a specific example, a cache line having t[4:2]=001, and s[4:3]=00 is found at locations 4 and 36 in cache 600. These two cache lines form one cache line set. A zero LRU bit may indicate line 4 has been used after line 36. In that case, an LRU bit of one would inform the memory controller that line 4 is the least recently used, and if texels having t[4:2]=001, and s[4:3]=00 coordinates are needed, they should be written into line 4 and not 36.

In cache memory 600, cache lines 0–63 are identified by the bits of the s and t coordinates which are the next higher order bits than were used to determine the offset in the example above. In this example, bits t[4:2] and s[4:3] are used. These 5 bits are concatenated to form an index signal which uniquely identifies each of 32 cache line sets. Other bits may be used in alternate embodiments. For example, the offset may be derived in a different fashion, and the lower order bits, say t[2:0] and s[2:0], or any other group of bits, may be used to determine the index signal. Alternately, only bits from the t coordinate might be used, for example t[8:4] may determine the index signal. Alternately, only bits from the s coordinate might be used. The index signal either partially, in a set associative cache, or completely, in a direct cache, identifies which cache lines may be used to hold a texel from the main memory.

The cache lines in cache 600 are preferably addressed in a two dimensional manner based on the spatial locality of the texture, to ensure uniform access to texels in all directions. Since the cache line 500 in FIG. 5 had a width greater than its height, the cache lines are arranged in the opposite manner, that is the height is greater than the width. In this way, two bits of t go to the offset, and three bits go to the index. Three bits of s are included in the offset, and two help make up the index. This adds up to 5 bits total in each s and t direction, meaning the cache memory 600 is 32 by 32 texels in size.

Figure 7:
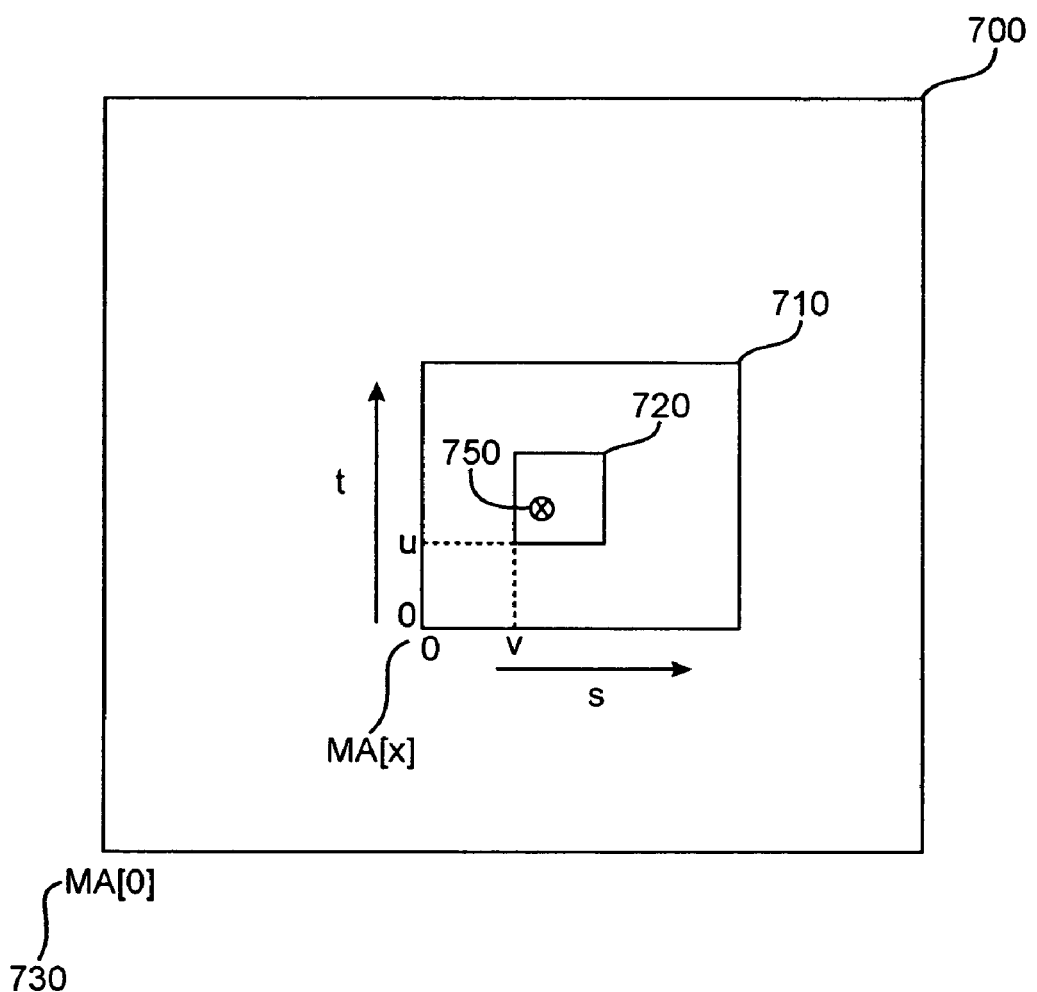
FIG. 7 is a representation of a texel in a portion of a texture where the texture resides in a main memory.

FIG. 7 is illustrative of how a portion of a texture, a copy of which is stored in a cache line, resides in the main memory. Main memory 700 holds texture 710, a portion 720 of which is copied to a cache line. The texture has coordinates s and t, and in this example, has an origin at 0,0, which corresponds to a memory address MA[x]. The portion 720 of the texture 710 has an origin at u,v, where u, and v are relative to the memory address MA[x]. Main memory 700 has origin 730 located at MA[0]. To find the absolute address corresponding to the origin of the portion 720 of the texture 710 to be placed in cache, the controller adds the texture origin address MA[x] to the relative coordinate values u and v. This absolute address is then referred to as a tag.

Figure 8:
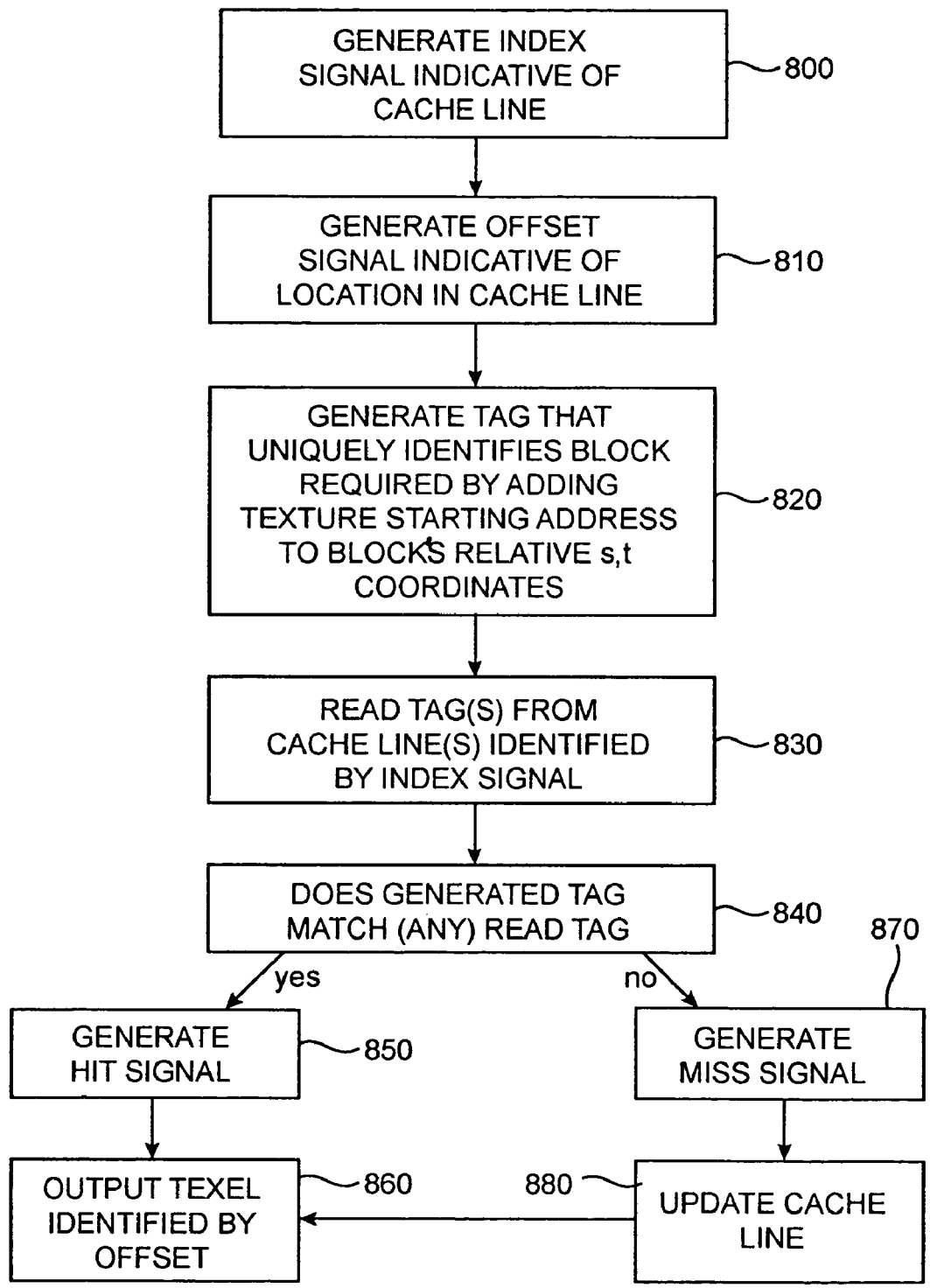
FIG. 8 is a flow chart of a method of retrieving a texel from a texel cache.

Accordingly, a texel may be retrieved from memory in the manner shown in FIG. 8. An index signal is generated in act 800, which will indicate a specific cache line if direct caching is used, or a set of cache lines if set association is used. There is no index signal if a fully associative cache is used, and act 800 is skipped. An offset is generated in act 810 which will indicate the location of the texel in the cache line. A tag is created in act 820 by or adding the texture starting address to the blocks relative s and t coordinates.

The tag or tags from the cache lines identified by the index signal are read in act 830, and are compared to the above calculated tag in act 840. If there is a match, a hit signal is generated act 850, and the texel may be read using the offset information, act 860. If there is no match, a miss signal is generated, 870, and the cache line is updated in act 880. Once the cache line is updated, the texel may be read using the offset signal, act 860. The updating of a cache line, act 880 is the subject of the above referenced related U.S. patent application Ser. No. 09/712,383, filed Nov. 13, 2000.

Figure 9:
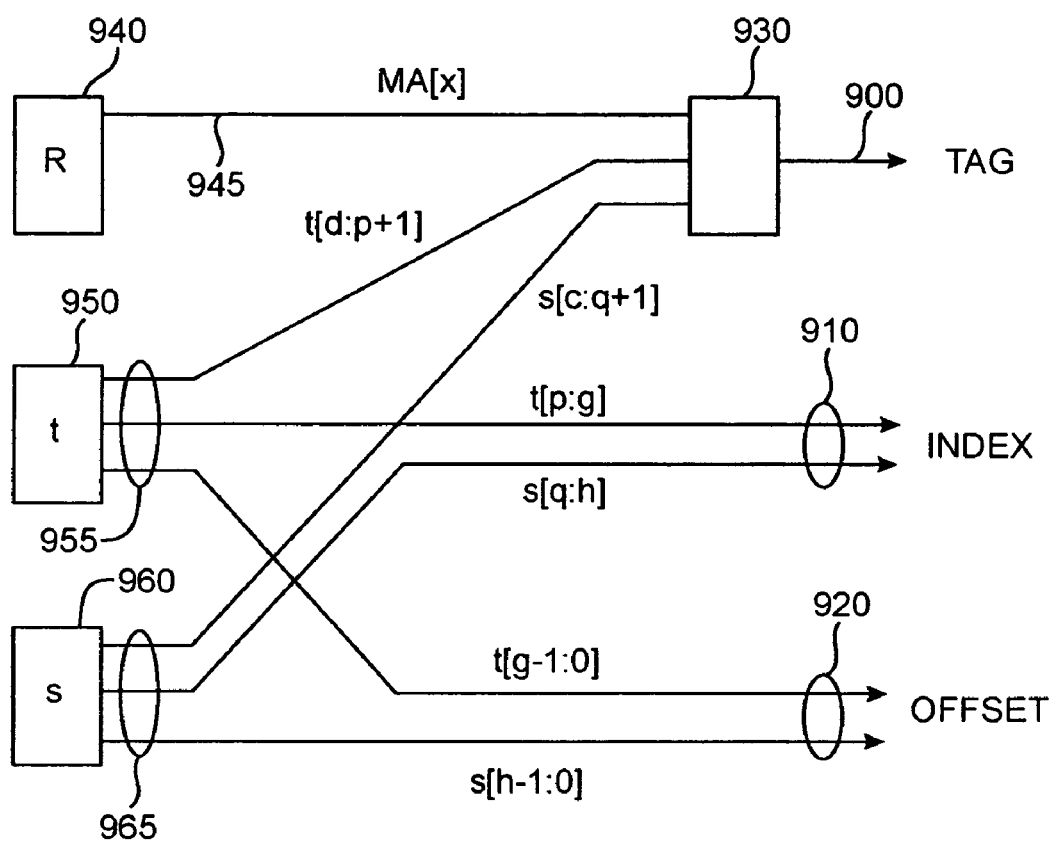
FIG. 9 is a block diagram of a cache address generator used in one embodiment of the present invention.

FIG. 9 is a conceptual diagram showing circuitry used for constructing the tag, index, and offset for a graphics subsystem consistent with one embodiment of the present invention. The circuitry includes a memory address register 940, t coordinate register 950, s coordinate register 960, and tag circuit 930. Bits t[p:g] and s[q:h], where p is greater than or equal to g and q is greater than or equal to h, are concatenated to form index 910. P, g, q, and h will vary depending on the number and arrangement of cache lines in the cache memory. If the cache used is fully associative, there is no index signal, and p=g and q=h. If the cache is direct or n-way associative, the s and t coordinates of a texel to be accessed are concatenated to create the index signal which is used to identify the possible cache line locations of the texel. The LSBs below the bits used for the index signal, namely t[g−1:0] and s[h−1:0], are concatenated to form the offset signal 920.

The use of an index and offset generated from the s and t coordinates does not uniquely identify a texel, because the starting address of the texture in main memory has not been used. For example, every texture will have the same s,t coordinates of 0,0. Therefore, the remaining unused MSBs of the s and t coordinates, t[d:p+1] and s[c:q+1], are used along with the texture starting address MA[x] 945 in tag circuit 930 to form the tag 900. Other information relating to the texture and its texel may also be used in generating the tag 900, such as the texture size—the width and height of the texture—and the texel size, typically 8, 16, or 32 bits. The tag of a required texel is then based on a texture's memory address that identifies the absolute location of the first texel of the texture in the main memory. In this way, each block in memory will have a unique tag which can be compared to the tags of the data in the cache lines. If there is a match between tags, the required texel can be found in the cache line with the corresponding tag. If there is no match, a miss occurs, and the required block must be moved from the main memory to the appropriate cache line, or cache line set.

Other bits of the s and t coordinates are redundant, and need not be included in the tag calculation. For example, since the index signal is used to select which cache lines are to be checked for a tag match, the index signal between the desired texel and selected cache lines must match.

Irrespective of whether the texture cache is direct mapped or associative, the texture cache can be divided into two or more parts that are used to simultaneously hold two or more textures or subtextures. Specifically, the index signal is modified by replacing one or more bits with a corresponding number of bits of another signal that is related to the textures or subtextures. The bit or bits in the modified index signal can be located anywhere in the index signal. For example, the MSBs or the index signal may be replaced, or the LSBs may be replace. Alternately, bits between the MSBs and LSBs may be replaced.

Using LOD as Measure of Locality

Figure 10:
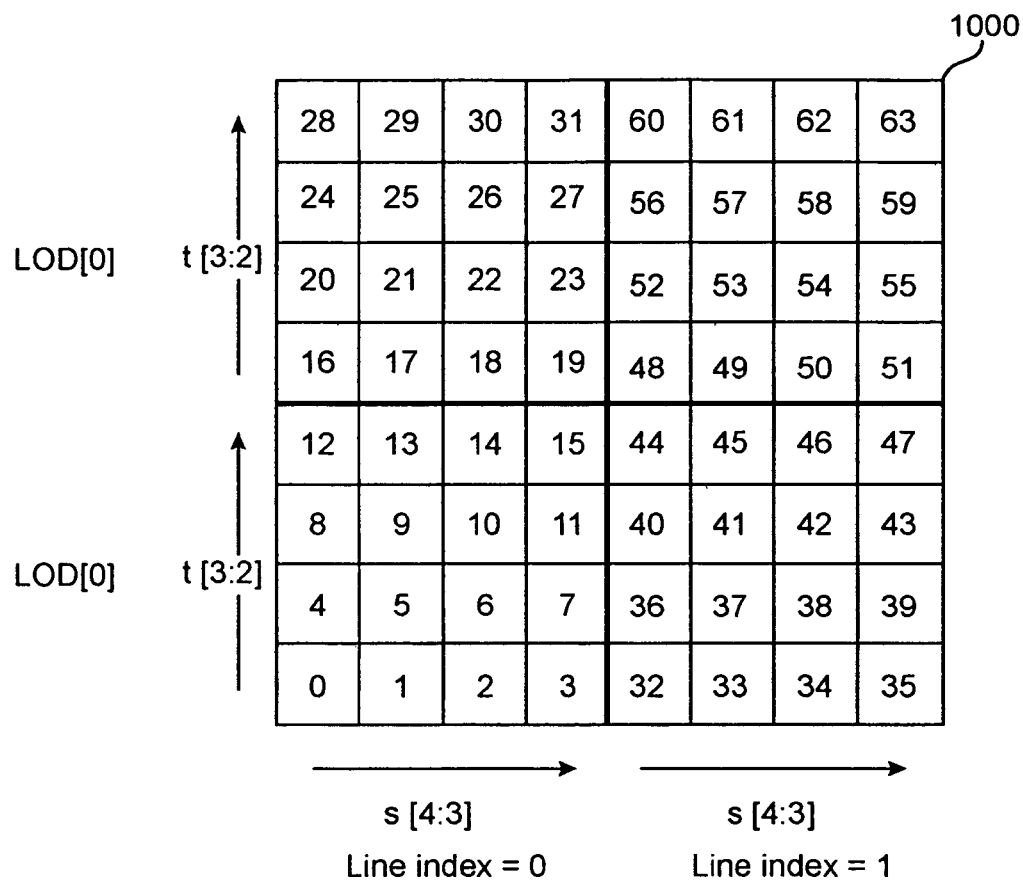
FIG. 10 is diagram of a texture cache which uses the LSB of an LOD signal as part of the index.

FIG. 10 is a diagram of another example of a cache line addressing scheme consistent with the present invention. Again, the cache shown is a 2-way set associative cache memory 1000. The cache may alternately be a 4-way, 8-way, or other n-way associative cache. The memory may alternately be a direct cache. It may further be a fully associative cache, though the benefits of the locality used are limited to the offset signal.

As above, this implementation uses bits of the s and t coordinates. In this specific example s[4:3], and t[3:2] are used. Other bits may be used depending on the size and arrangement of the cache lines and cache memory. A bit from the level of detail (LOD) value is used also. In this way, texels from two different LODs can exist simultaneously in cache. This is of particular use with trilinear interpolation.

Figure 11:
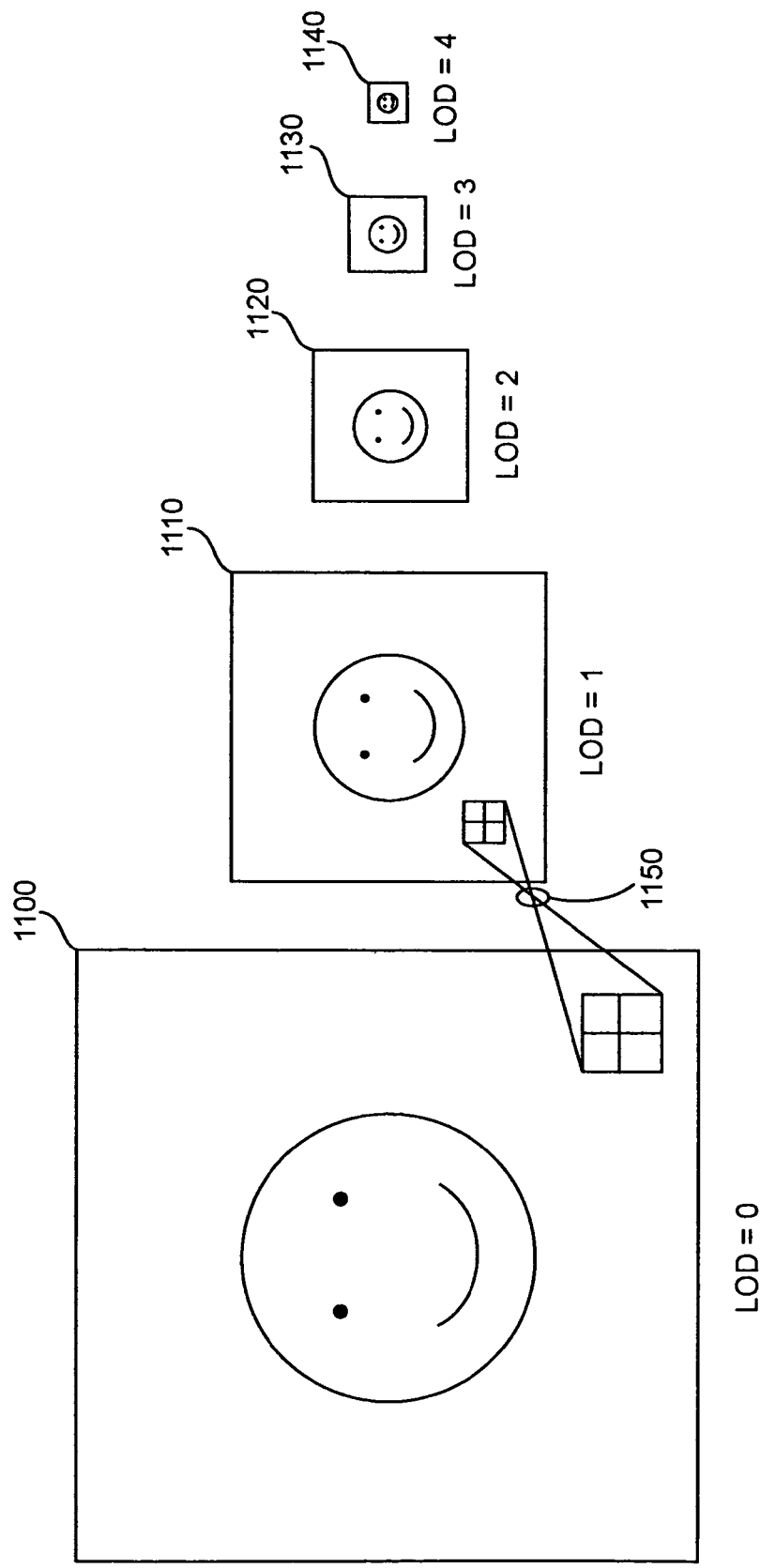
FIG. 11 is illustrative of MIPmaps.

An explanation of LOD and trilinear interpolation can be had with reference to FIG. 11. If a graphic image contains a road going off into the distance, the grain boundaries of the rocks and pebbles which make up the asphalt will get closer together as the apparent distance from the viewer increases. To handle the shrinking boundaries, the road texture used can be stored in memory at different levels of detail, or LODs. Where the highway appears close, a low level of minification is used. As the road stretches into the distance, higher levels of minification are used. Since road texture does not work well in line drawings, FIG. 11 shows a smiley face. An LOD (1100) of zero, or binary 000 is the lowest level of minification. The minification proceeds with each LOD having ¼ the area of the succeeding LOD. In other words, each progressively smaller map is reduced in size by a factor of two in each dimension as compared to a predecessor map: The second LOD has a value of 1, which is binary 001. These textures are referred to as MIPmaps.

If the textures in FIG. 11 was pavement instead of smiley faces, we could use the MIPmaps to construct the highway referred to above. The close in part of the highway would use LOD=0, and the furthest portion would be made using LOD=4. To make the surface of the highway appear smooth and avoid steps in the texture as the LOD changes, some filtering needs to take place. For intermediate points, where an LOD of zero is too large, and an LOD of 1 is too small, trilinear filtering is used and is represented by 1150. Here, the average of four texels from LOD 1100 and four texels from LOD 1110 is taken, and used by the graphics pipeline in determining the color and intensity of the corresponding pixel. In this way, there is no step, or sharp boundary in the highway texture; the steps are smoothed out by the trilinear filtering.

Neighboring LODs will always have opposite LSBs. This is true since even numbered LODs will have a 0 as the LSB, and odd numbered LODs will have 1 as the LSB. In this example, the largest LOD (1100) corresponds to binary 000, and next LOD (1110) to 001. Using the LSB of the LOD in FIG. 10 ensures that the texels needed for trilinear filtering will not overwrite each other. Alternately, two or more LSBs of the LOD may be used if it is desired that three or more LODs exist in cache simultaneously. This use of LOD eliminates cases wherein different MIPmaps of the same texture compete for the same cache line, because a different index is generated for neighboring MIPmaps.

Figure 12:
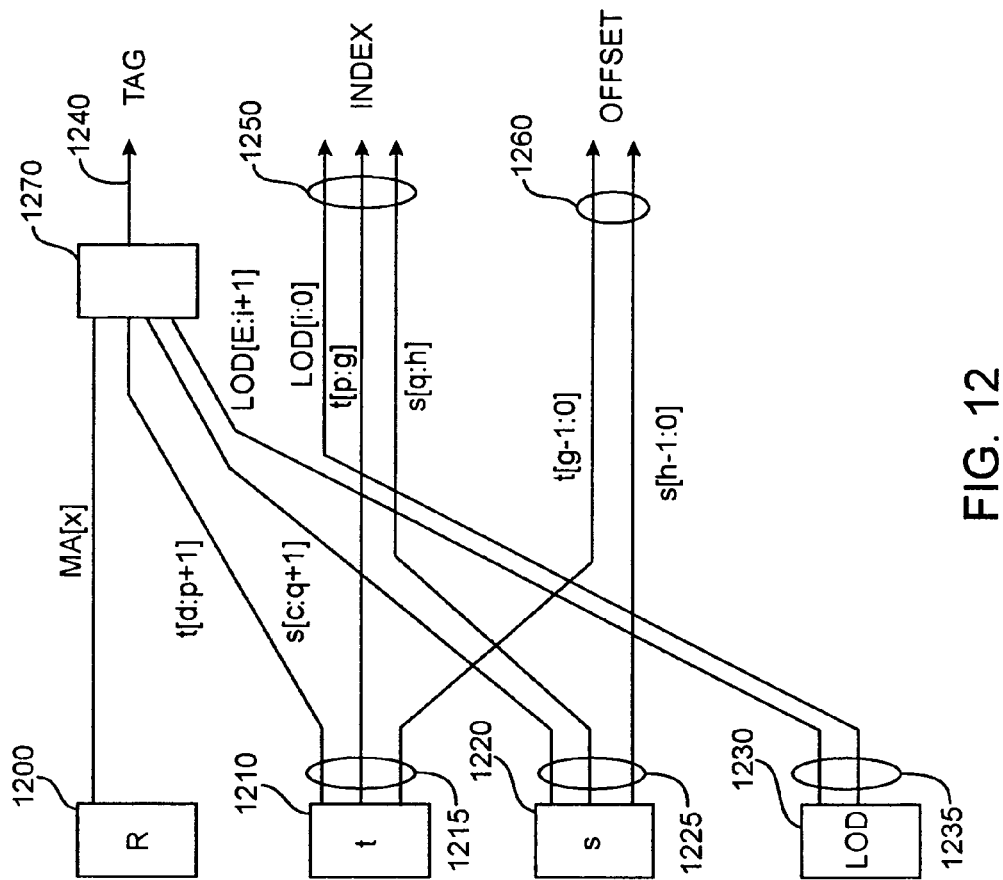
FIG. 12 is a block diagram of a cache address generator used in one embodiment of the present invention.

FIG. 12 is a conceptual block diagram showing the circuitry for a cache address generator used for constructing the tag, index, and offset for a graphics subsystem consistent with this embodiment of the present invention. The circuitry includes a memory address register 1200, t coordinate register 1210, s coordinate register 1220, LOD register 1230, and tag circuit 1270. Bits $t[p:g]$, $s[q:h]$, and $lod[i:0]$, where p is greater than or equal to g, q is greater than or equal to h, and i is greater than or equal to 0, are concatenated to form index 1250. P, g, q, and h will vary depending on the number and arrangement of cache lines in the cache memory. These will also vary if the cache is direct or n-way associative, as well as with the number of cache lines per set. For example, in an embodiment which uses 2-way association, one less bit of s is used for index signal as compared to an implementation using direct caching. The MSBs of the index signal may be bits from the LOD signal and the LSBs of the index signal may be bits from the s signal, or any other combination may be used. The LSBs below the bits used for the index signal, namely $t[g-1:0]$ and $s[h-1:0]$, are concatenated to form the offset signal 1260. The remaining unused MSBs of the s and t coordinates, $t[d:p+1]$ and $s[c:q+1]$, and level of detail bits $LOD[e:i+1]$, are used along with the texture starting address MA[x] in tag circuit 1270 to form the tag 1240. Other information relating to the texture and its texel may also be used in generating the tag 1240, such as the texture size—the width and height of the texture—and the texel size, typically 8, 16, or 32 bits.

Using Texture Identification as Measure of Locality

Figure 13:
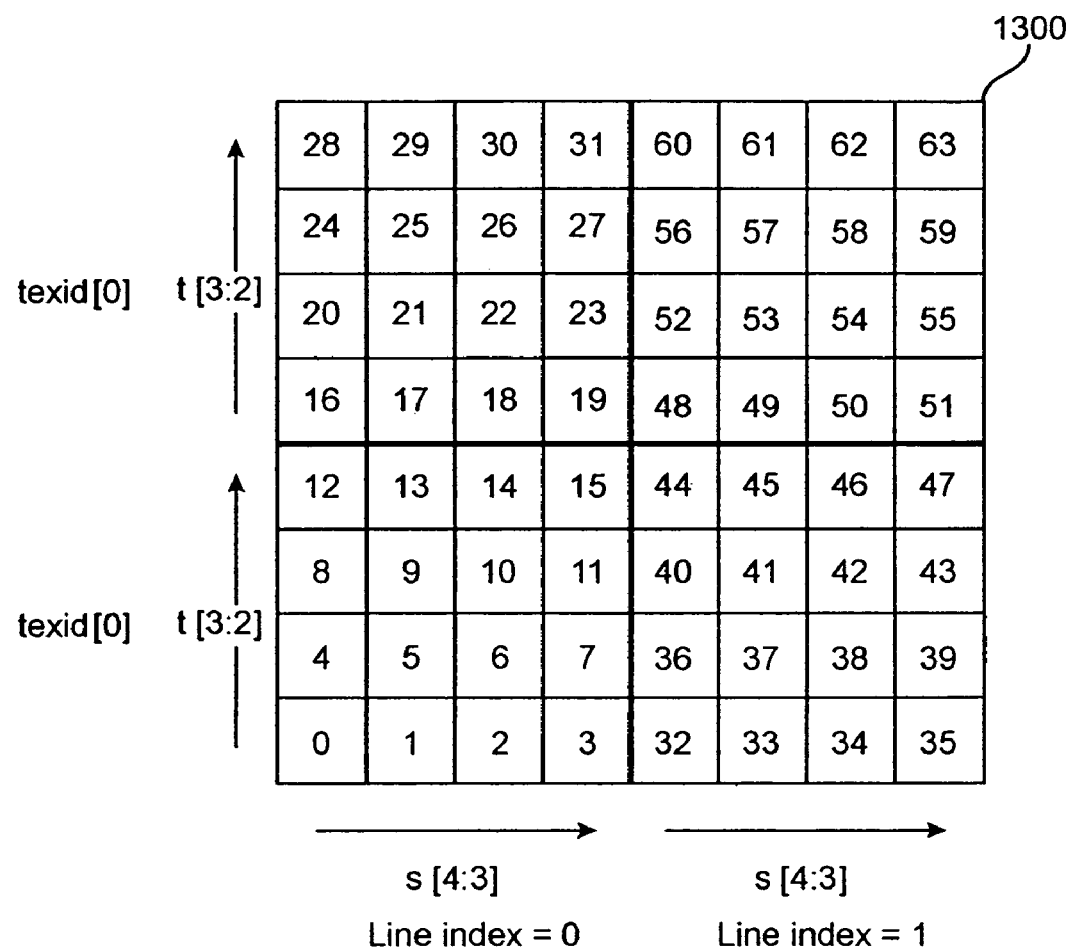
FIG. 13 is diagram of a texture cache which uses the LSB of a texture id signal as part of the index.

FIG. 13 is a diagram of yet another example of a cache line addressing scheme consistent with the present invention. Again, the cache shown is a 2-way set associative cache memory 1300. The cache may alternately be a 4-way, 8-way, or other n-way associative cache. The memory may alternately be a direct cache. It may further be a fully associative cache, though as above, the benefits of the locality used are limited to the offset signal.

As before, this implementation uses bits of the s and t coordinates in identifying the individual cache lines. In this specific example $s[4:3]$, and $t[3:2]$ are used. Other bits may be used depending on the size and arrangement of the cache lines and cache memory. A bit from the texture id is also used. In this way, texels from two different textures can exist simultaneously in cache.

Figure 14:
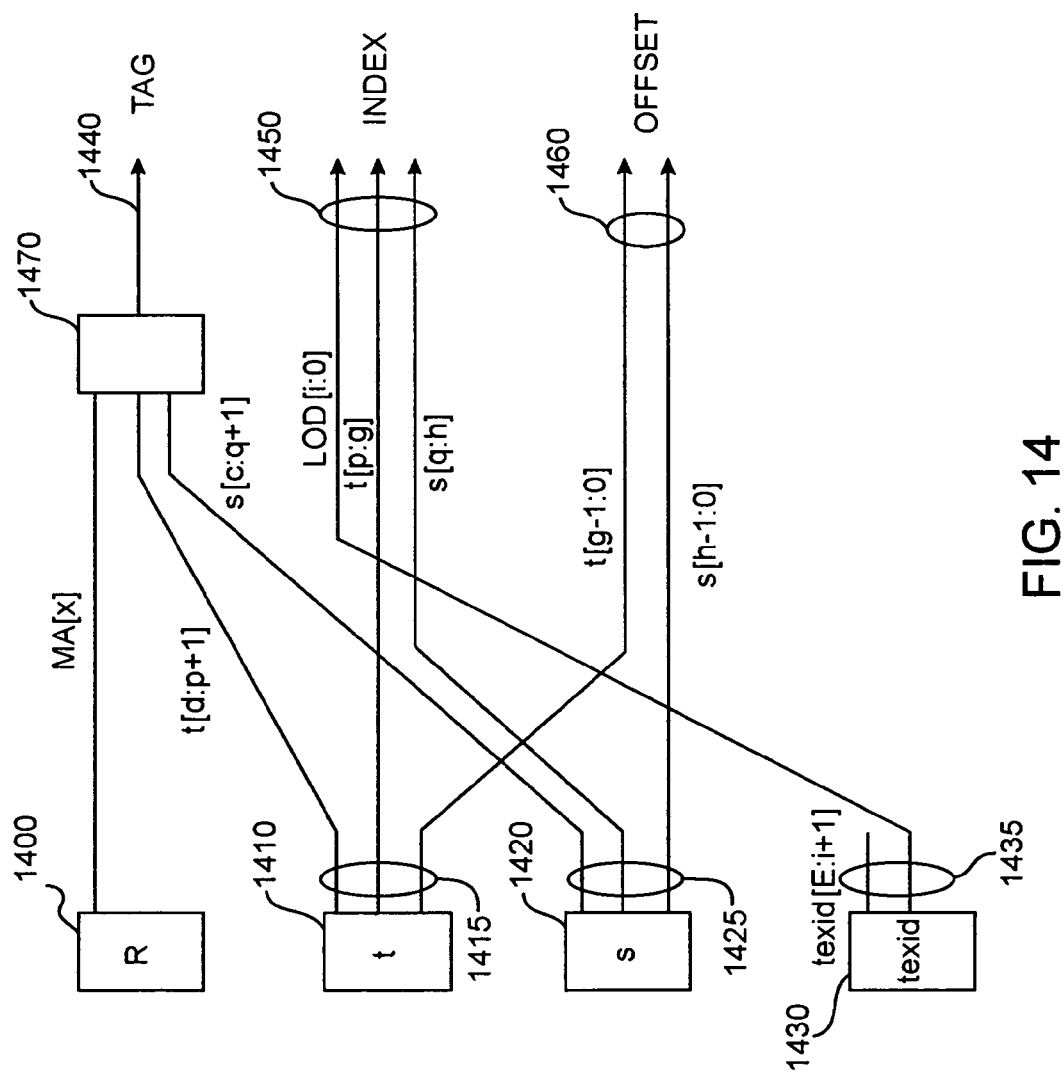
FIG. 14 is a block diagram of a cache address generator used in one embodiment of the present invention.

FIG. 14 is a conceptual block diagram showing circuitry used for constructing the tag, index, and offset for a graphics subsystem consistent with this embodiment of the present invention. The circuitry includes a memory address register 1400, t coordinate register 1410, s coordinate register 1420, texture id register 1430, and tag circuit 1470. Bits $t[p:g]$, $s[q:h]$, and $texid[i:0]$, where p is greater than or equal to g, q is greater than or equal to h, and i is greater than or equal to 0, are concatenated to form index 1450.

P, g, q, and h will vary depending on the number and arrangement of cache lines in the cache memory. These will also vary if the cache is direct or n-way associative, as well as with the number of cache lines per set. For example, in an embodiment which uses 2-way association, one less bit of s is used for index signal as compared to an implementation using direct caching. P, g, q, and h will also be reduced if more bits of the texture id is used. For example, in one implementation where no texture id bits are used, 3 bits of the t coordinate, and 2 bits from s are concatenated to form the index signal. In an implementation where one bit of texture id is used, only two bits of t and 2 bits of the s coordinates are used. In a different implementation, two bits of texture id, one bit of t, and 2 bits of s could be used.

The MSBs of the index signal may be bits from the texid signal and the LSBs of the index signal may be bits from the s signal, or any other combination may be used. The LSBs below the bits used for the index signal, namely $t[g-1:0]$ and $s[h-1:0]$, are concatenated to form the offset signal 1460. The remaining unused MSBs of the s and t coordinates, $t[d:p+1]$ and $s[c:q+1]$, are used along with the texture starting address MA[x] in tag circuit 1470 to form the tag 1440. Other information relating to the texture and its texel may also be used in generating the tag 1440, such as the texture size—the width and height of the texture—and the texel size, typically 8, 16, or 32 bits.

Using r Coordinate as Measure of Locality

Figure 24:
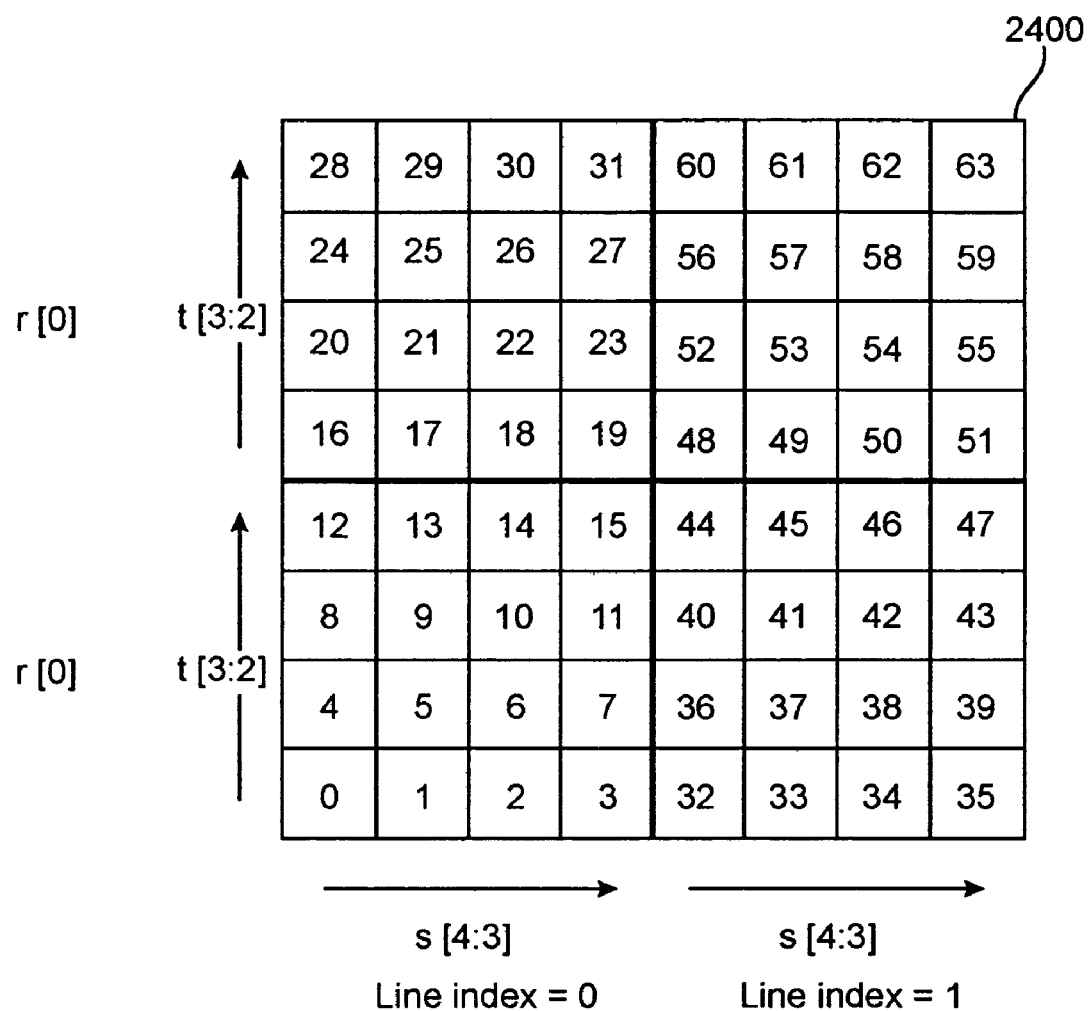
FIG. 24 shows a diagram of a texture cache which uses the LSB of the r coordinate of a 3-D texture as part of the index.

FIG. 24 is a diagram of further example of a cache line addressing scheme consistent with the present invention. Again, the cache shown is a 2-way set associative cache memory 2400. The cache may alternately be a 4-way, 8-way, or other n-way associative cache. The memory may alternately be a direct cache. It may further be a fully associative cache, though the benefits of the locality used are limited to the offset signal.

This implementation is used in one embodiment of the present invention which supports 3-D textures. As before, bits of the s and t coordinates identify cache lines. This specific example uses s[4:3], and t[3:2]. Other bits may be substituted depending on the size and arrangement of the cache lines and cache memory. A bit from the third texture coordinate, r, is also used, in this particular example it is the LSB, r[0]. The cache is effectively split in half, with half the cache lines having r[0] equal to zero, and half the cache lines having r[0] equal to one. In this way, texels from two different texture levels in a 3-D texture can exist simultaneously in cache. As before, this is of particular use with trilinear filtering. Alternately, two or more LSBs of the r coordinate may be used if it is desired that three or more texture levels exist together in cache.

Figure 25:
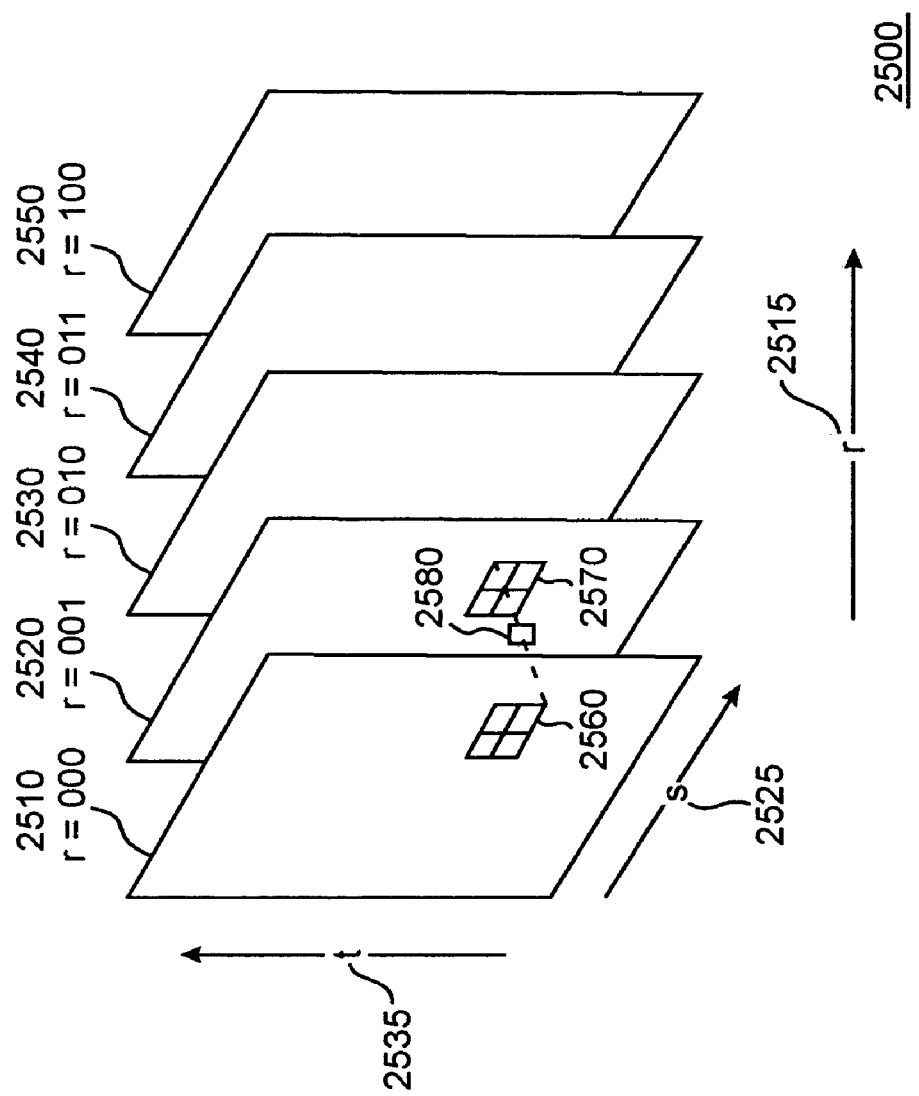
FIG. 25 is illustrative of 3-D textures.

A further understanding of 3-D textures and trilinear filtering can be had with reference to FIG. 25. Included is a set of 2-D texture slices, or levels, 2510, 2520, 2530, 2540, and 2550. Each 2-D texture slice has an s 2525 and t 2535 coordinate, and each is identifiable from its r coordinate 2515. In this example, the first 2-D texture slice 2510 has an r coordinate equal to 0, or binary 000. The second 2-D texture slice 2520 has an r coordinate equal to 1, or binary 001. The third 2-D texture slice 2530 has an r coordinate equal to 2, or binary 010. As can be seen from this example, each 2-D texture slice's r coordinate has an LSB which is the opposite of its neighboring 2-D texture slice.

Texture slice 2510 includes a quad of texels 2560, and texture level 2520 has a quad of texels 2570. In determining a texel value for a point between these two texture slices, trilinear filtering may be used. The texel quads 2560 and 2570 are weighted and averaged to determine a texel value 2580. If the LSB of r is used in generating the index signal, texels from texture level 2510 will not override texels from texture level 2520. This prevents the act of trilinear filtering from thrashing the cache. The use of at least one bit of the r coordinate eliminates cases where different texture slices of the same 3-D texture compete for the same cache line, because a different index signal is generated for neighboring texture slices.

Figure 26:
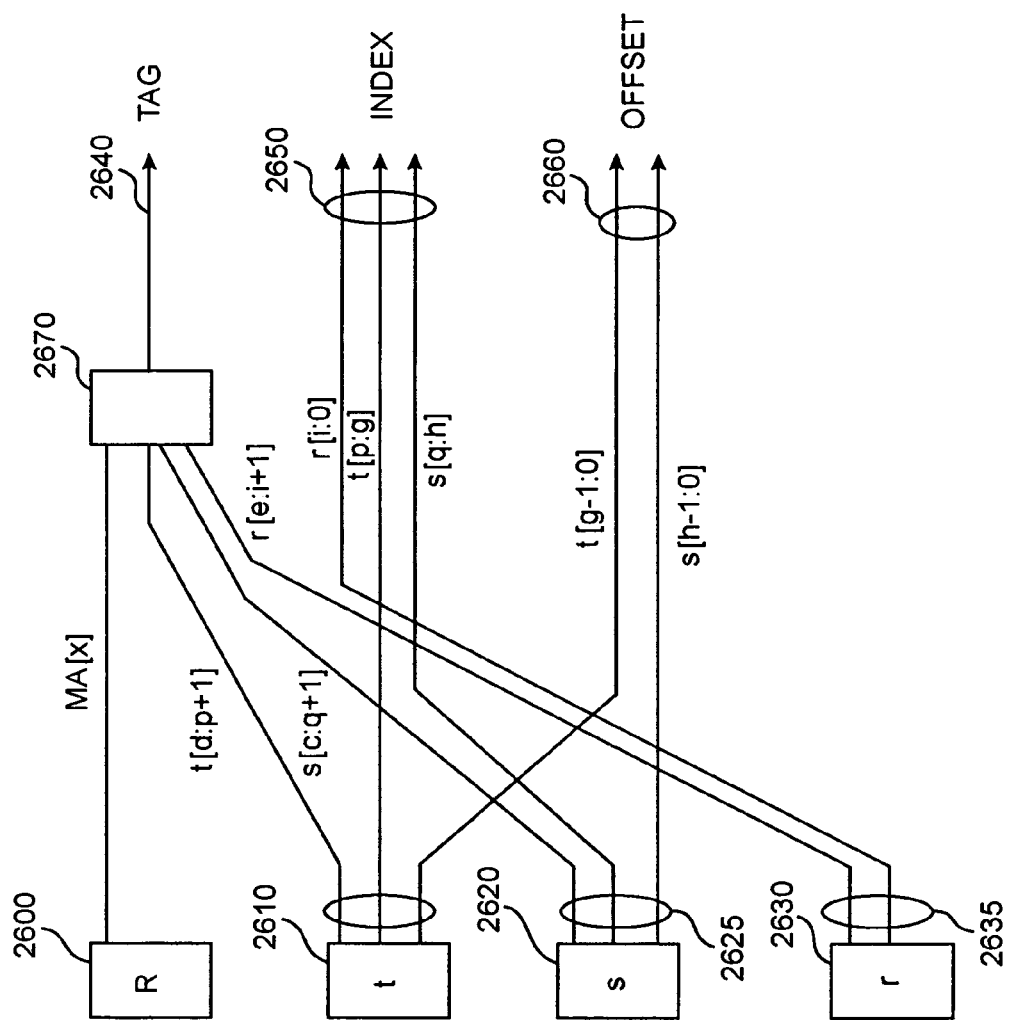
FIG. 26 is a block diagram of a cache address generator used in one embodiment of the present invention.

FIG. 26 is a conceptual block diagram showing the circuitry for a cache address generator used for constructing the tag, index, and offset for a graphics subsystem consistent with this embodiment of the present invention. The circuitry includes a memory address register 2600, t coordinate register 2610, s coordinate register 2620, r coordinate register 2630, and tag circuit 2670. Bits t[p:g], s[q:h], and r[i:0], where p is greater than or equal to g, q is greater than or equal to h, and i is greater than or equal to 0, are concatenated to form index 2650. P, g, q, and h will vary depending on the number and arrangement of cache lines in the cache memory. These will also vary if the cache is direct or n-way associative, as well as with the number of cache lines per set. For example, in an embodiment which uses 2-way association, one less bit of s is used for index signal as compared to an implementation using direct caching. The MSBs of the index signal may be bits from the r coordinate and the LSBs of the index signal may be bits from the s signal, or any other combination may be used. The LSBs below the bits used for the index signal, namely t[g−1:0] and s[h−1:0], are concatenated to form the offset signal 2660. The remaining unused MSBs of the s, t, and r coordinates, t[d:p+1], s[c:q+1], and r[e:i+1], are used along with the texture starting address MA[x] in tag circuit 2670 to form the tag 2640. Other information relating to the texture and its texel may also be used in generating the tag 2640, such as the texture size—the width and height of the texture—and the texel size, typically 8, 16, or 32 bits.

Using Memory Address for Randomization

Figure 15:
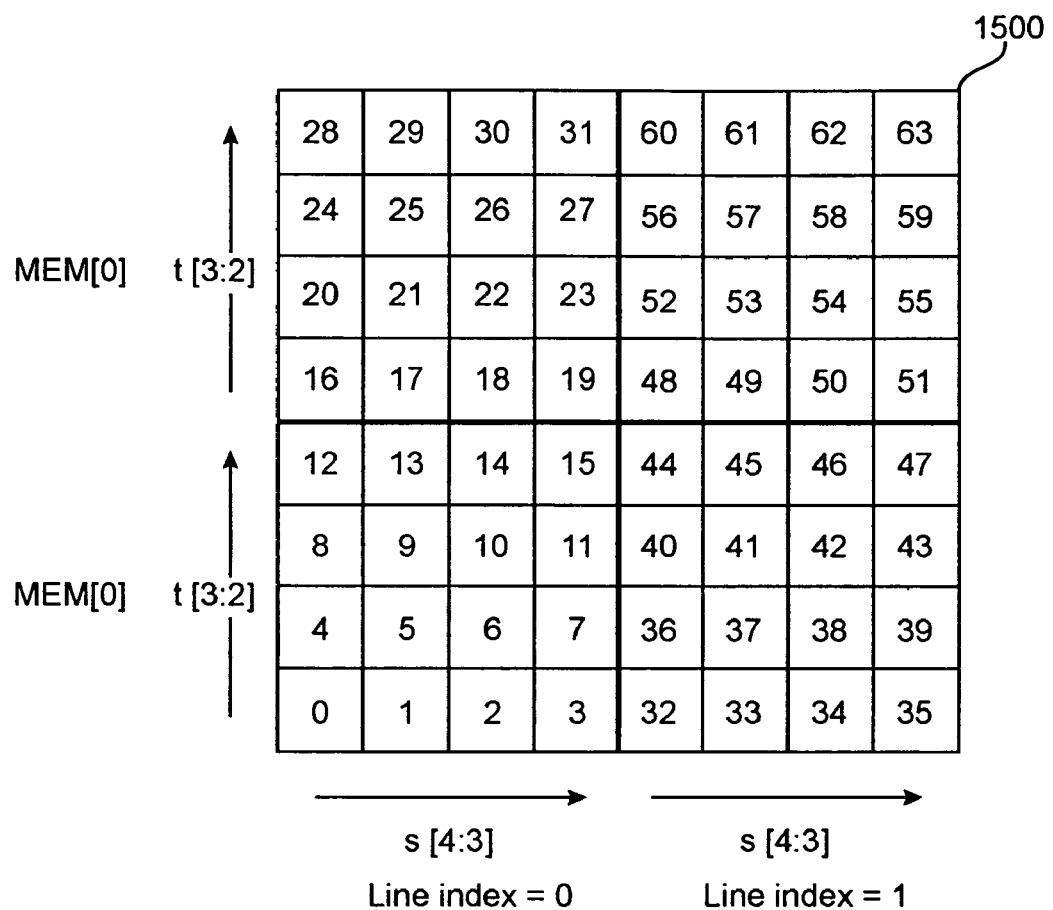
FIG. 15 is diagram of a texture cache which uses the LSB of a memory address as part of the index.

FIG. 15 is a diagram of another example of a cache line addressing scheme consistent with the present invention. As before, the cache shown is a 2-way set associative cache memory 1500. As with the previous embodiments, the cache may alternately be a 4-way, 8-way, or other n-way associative cache. The memory may alternately be a direct cache. It may further be a fully associative cache, though the benefits of the locality used are limited to the offset signal.

As before, this implementation uses bits of the s and t coordinates in identifying the individual cache lines. In this specific example s[4:3], and t[3:2] are used. Other bits may be used depending on the size and arrangement of the cache lines and cache memory. A bit from the memory address, mem[0] is also used. In this example, one bit of main memory address was substituted for one bit of t. Alternately, one bit of the s coordinate may have been replaced. Further still, one bit of t and one bit of the s coordinate may be changed to bits of memory address consistent with the present invention.

In this way, some randomization occurs, which helps prevent any pattern induced thrashing. Textures tend to be stored in the lower left corner of the cache since each texture has its origin at t=0 and s=0. Substituting some bits of the memory address for s or t, or both, allows pieces of two or more textures that would otherwise be held in the same cache line to be simultaneously held in different cache lines. Specifically, the randomized allocation of cache lines eliminates the tendency for textures to be stored in the lower left corner, and therefore avoids thrashing that can occur when only s and t coordinates are used.

Figure 16:
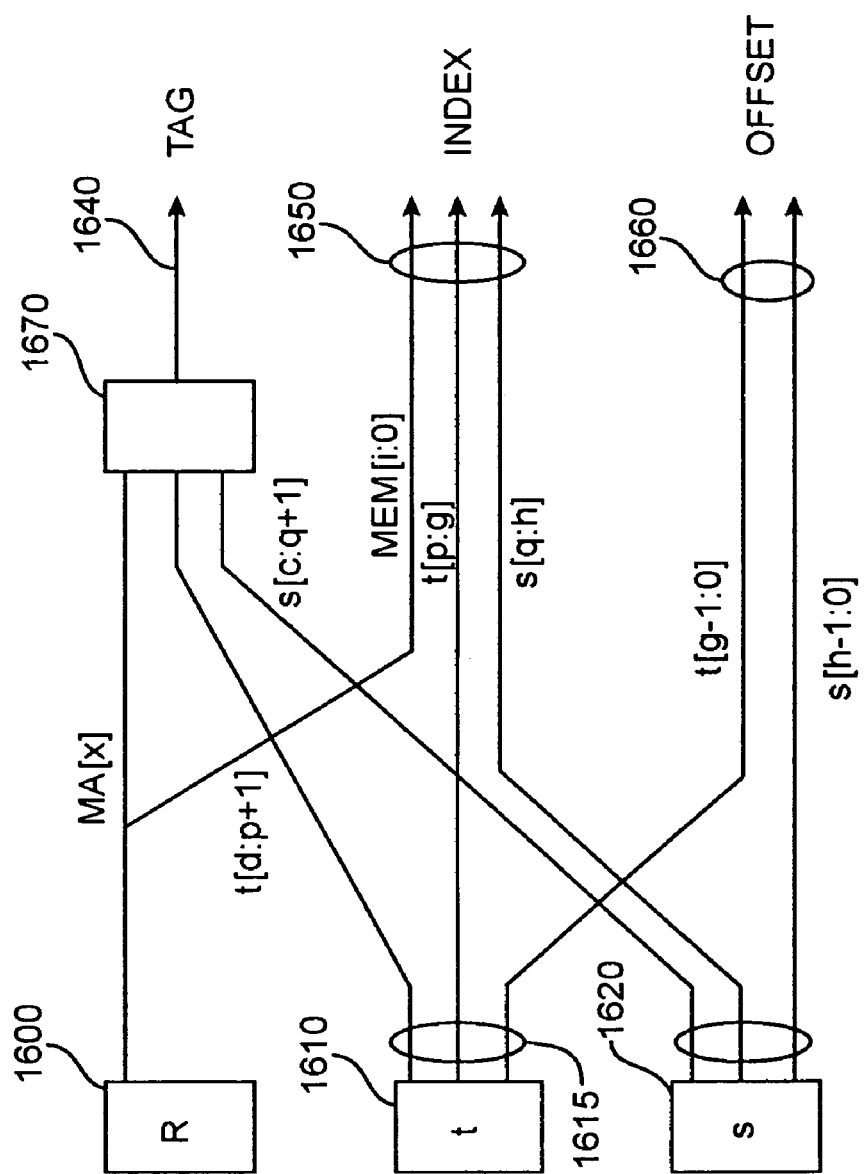
FIG. 16 is a block diagram of a cache address generator used in one embodiment of the present invention.

FIG. 16 is a conceptual block diagram showing circuitry for a cache address generator used for constructing the tag, index, and offset for a graphics subsystem consistent with this embodiment of the present invention. The circuitry includes a memory address register 1600, t coordinate register 1610, s coordinate register 1620, and tag circuit 1670. Bits t[p:g], s[q:h], and mem[i:0], where p is greater than or equal to g, q is greater than or equal to h, and i is greater than or equal to 0, are concatenated to form index 1650. Bits mem[i:0] may be used, alternately any bits, such as bits mem[j:i] where j is greater than or equal to i may be used. Bits mem[j:i] are bits of the texture starting address in the main memory.

P, g, q, and h will vary depending on the number and arrangement of cache lines in the cache memory. These will also vary if the cache is direct or n-way associative, as well as with the number of cache lines per set. For example, in an embodiment which uses 2-way association, one less bit of s is used for index signal as compared to an implementation using direct caching. P, g, q, and h will also be reduced if more bits of the texture id is used. For example, in one implementation where no texture id bits are used, 3 bits of the t coordinate, and 2 bits from s are concatenated to form the index signal. In an implementation where one bit of texture id is used, only two bits of t and 2 bits of the s coordinates are used. In a different implementation, two bits of texture id, one bit of t, and 2 bits of s could be used.

The MSBs of the index signal may be bits from the main memory address and the LSBs of the index signal may be bits from the s coordinates, or any other combination may be used. The LSBs below the bits used for the index signal, namely t[g−1:0] and s[h−1:0], are concatenated to form the offset signal 1660. The remaining unused MSBs of the s and t coordinates, t[d:p+1] and s[c:q+1], are used along with the texture starting address MA[x] in tag circuit 1670 to form the tag 1640. Other information relating to the texture and its texel may also be used in generating the tag 1640, such as the texture size—the width and height of the texture—and the texel size, typically 8, 16, or 32 bits.

Figure 17:
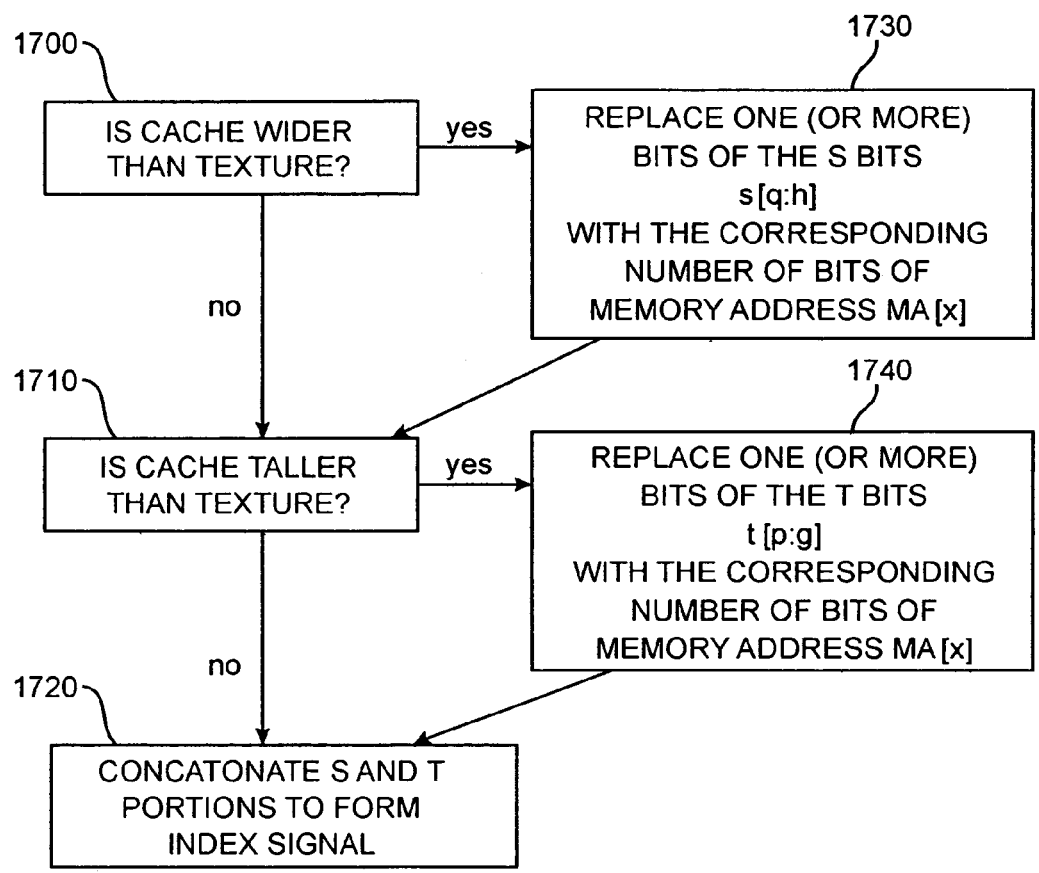
FIG. 17 is a flowchart showing the acts used in forming an index signal in one embodiment of the present invention.

The number of storage elements required to hold all texels of a texture may be smaller or larger than the number of storage elements in cache. If the number of elements in cache is smaller than the number of texels in a texture, then only some of the texels are held in cache, and the remaining are brought in when required. Textures will compete for the lower left corner of the cache only if the texture is smaller than the cache in either the s or t directions. If the texture is larger than the cache in the s and t directions, the cache is completely filled with that texture, and no randomization is required. Specifically, when a texture to be stored in cache has fewer texels than the number of storage elements in the cache, along either the s or t axis, the cache address generator replaces bits of the index signal with a corresponding number of bits from the textures memory address. The number of bits replaced relates to the sized of the texture in relation to the size of the cache. FIG. 17 is a flow chart for implementing one embodiment of the present invention which makes use of the randomization induced by the substitution of bits of the address of the texture's origin for bits of s and t.

In FIG. 17, a determination is made as to whether the cache is wider than the texture being stored in cache in act 1700. If the answer is yes, then the next texture to be stored will have the same origin at t[0]=s[0]=0, and thrashing will occur. To avoid this, in act 1730, one or more bits of s[q:h] (the bits that ordinarily would go toward making up the index signal) are replaced by bits of the texture's origin address in memory, MA[x].

In act 1710 a determination is made as to whether the cache is taller than the texture being stored. If it is, then one or more bits of t[p:g] are replaced by bits of the texture's origin address in memory, MA[x]. In this way, since different textures have different origins, the chances that the next texture being stored in cache will overwrite this texture is reduced.

Texture Cache Subsystem

Figure 18:
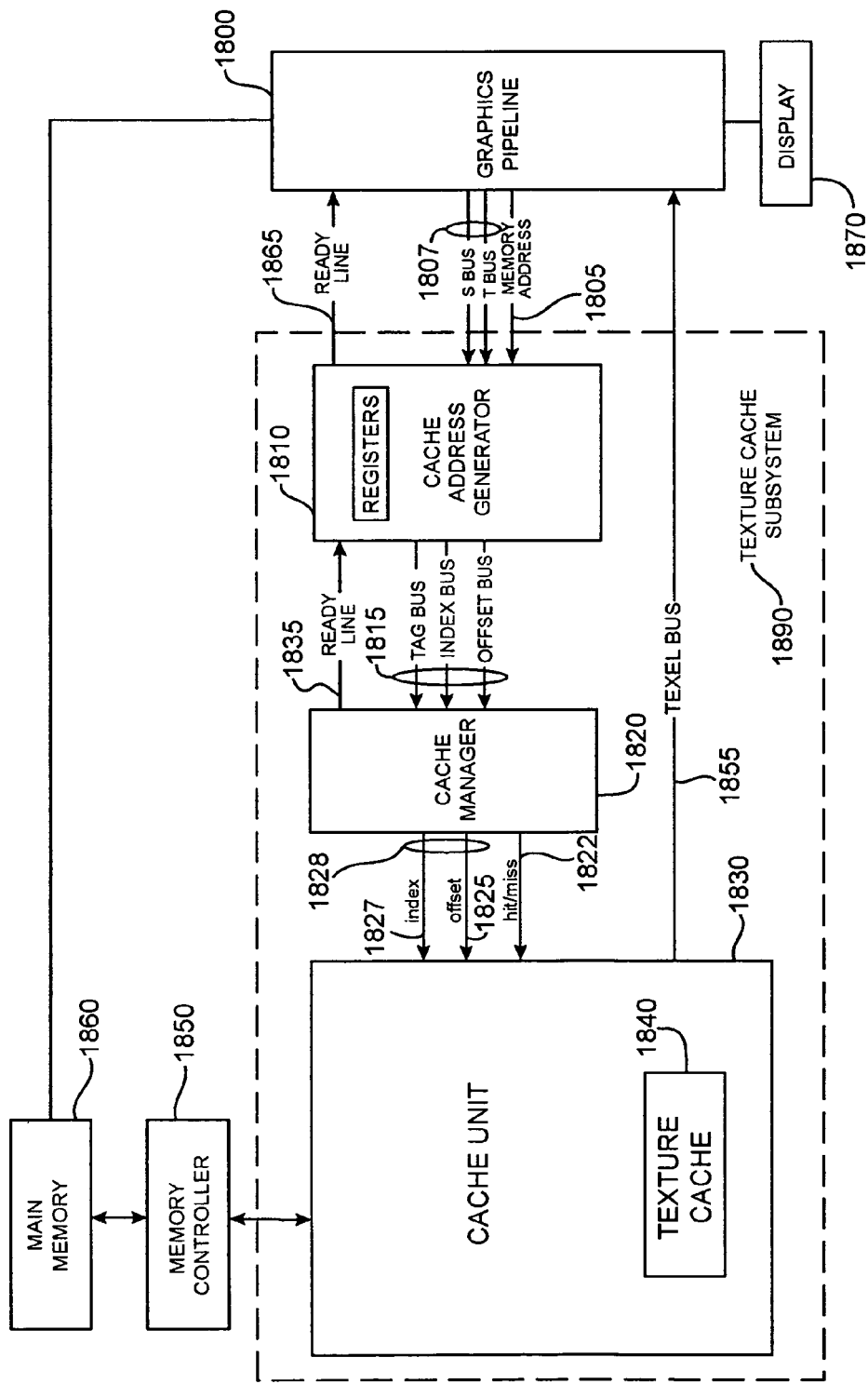
FIG. 18 is a block diagram of a texture cache subsystem.

FIG. 18 is a block diagram of the texture cache subsystem 1890 and some surrounding components. The texture cache subsystem 1890 includes a cache unit 1830 which holds a texture cache 1840, a cache manager 1820, and a cache address generator 1810. Surrounding components include graphic pipeline 1800, display 1870, memory controller 1850, and main memory 1860. Graphics pipeline 1800 provides s and t coordinates 1807 when a ready state, or not stalled state, is seen on ready line 1865. If the ready line 1865 indicates a not ready state, graphics pipeline 1800 will wait for a ready state before sending coordinates. In one embodiment of the present invention, graphics pipeline 1800 also provides on memory address bus 1805 a starting address that indicates the location of the first texel in the texture in the main memory 1860. The interface between the subsystem 1890 and graphics pipeline 1800 can be different in other embodiments. For example, the memory address may come from elsewhere, including inside the graphics subsystem 1800 itself.

In response to the s and t coordinates, subsystem 1890 supplies on texel bus 1855 the identified texel which has been retrieved from texture cache 1840. Graphics pipeline 1800 uses the texel in determining the color and intensity of a pixel on the screen of display 1870.

Cache address generator 1810 receives the memory address on memory address bus 1805, as well as the s and t coordinates on buses 1807. In response, the cache address generator 1810 outputs a tag, index, and offset on cache address bus 1815. This may be done in accordance with one of the embodiments of a cache address generator as discussed above, or by other appropriate methods.

Cache manager 1820 has cache address bus 1815 as an input, and has as its outputs index and offset lines 1828, as well as hit/miss line 1825, which couple to the cache unit 1840, and ready line 1835 which couples to the cache address generator 1810. Cache manager 1820 responds to address signals on address bus 1815 by checking a look-up table to determine if a storage element in texture cache 1840 contains the required texel, or whether the texel needs to be fetched from main memory 1860. Specifically, cache manager examines the index signal and determines the cache lines in which the required texel may be stored. The cache manager then compares the tag portion of bus 1835 with tags for the predetermined cache lines. If there is a match, the texel is present, and a hit is said to have occurred. In this case, the signal on the hit/miss line 1822 is asserted active. If there is no match, the texel is to be fetched from memory, a miss has happened, and the signal on the hit/miss line 1822 will go inactive.

Cache manager 1820 also provides a signal on ready line 1835 which indicates that the texel is available on texel bus 1855. Ready line 1835 is coupled to cache address generator 1810, which has ready line 1865 as its output coupling to graphics pipeline 1800. Graphics pipeline 1800 responds to an inactive signal on the ready line 1865 by reading the texel on texel bus 1855.

If a miss occurs, cache manager 1820 outputs an inactive signal on the hit/miss line 1822, and provides the required texel address to cache unit 1830. Cache unit 1830 fetches the required texel from main memory 1860, stores it in texture cache 1840, and outputs the texel to the graphics pipeline 1800 on texel bus 1855. One implementation of a cache unit consistent with the present invention includes a buffer to hold a texels address while the texel is being fetched from main memory 1860. Specifically, one implementation uses a first-in-first-out memory (FIFO).

Additionally, subsystem 1890 receives the following information from the CPU regarding the texture, texture size including height and width, texel size, typically 1,2 or 4 bytes, whether the texture is MIPmapped, and the number of textures currently in use so that texels of multiple textures can coexist in the same cache 1840.

Texel Quad Position in Cache

Frequently a texture of a given size is to be placed over a group of pixels on a screen where the number of pixels involved is less than the number of texels in the texture. In this case, a method know as box filtering is employed to reduce the number of texels to correspond to the amount of pixels.

In box filtering, four adjacent texels are averaged to determine a texel value which is assigned by the graphics pipeline to a pixel on the display. Therefore, it is very desirable for the graphics to be able to request and receive texels in groups of 4 every clock cycle, where a clock cycle refers to the amount of time the graphics engine spends generating the color and intensity for one pixel. A group of 4 texels is referred to as a texel quad, or simply quad. Box filtering is also known as bilinear filtering. Trilinear filtering, discussed above with regards to MIPmapping, is similar in that two groups of four texels, one group per MIPmap are averaged together.

A difficulty arises in that the texels required for box filtering are not always available in cache, and must be fetched from the main memory. This is a comparatively slow process, taking many clock cycles to complete. Since a steady steam of texel quads is required by the graphics pipeline, it is necessary that the fetching of texels from memory happen in such a way as to not stall the rendering of the on-screen images.

Figure 19:
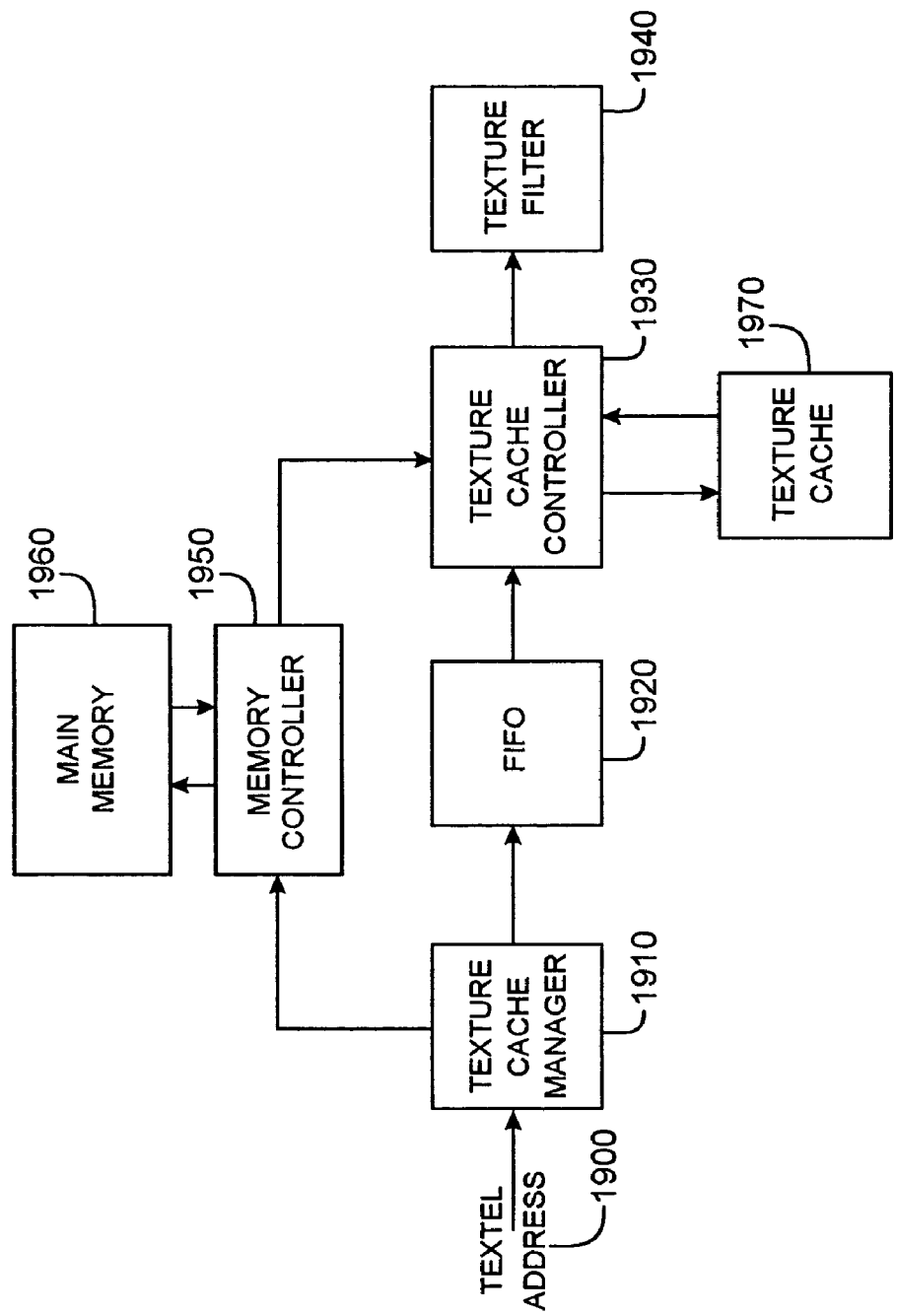
FIG. 19 is a block diagram of a path in the texture cache subsystem.

FIG. 19 illustrates a buffering apparatus using a FIFO that solves this problem for a texture subsystem designed in accordance with the present invention. This buffering apparatus includes a texture cache manager 1910, a FIFO 1920, texture cache controller 1930, texture filter 1940, memory controller 1950, main memory 1960, and texture cache 1970. Texel address 1900 is input to texture cache manager 1910. Texel cache manager 1910 generates cache addresses with a cache address generator. The cache manager 1910 further examines the texel's tag against appropriate tags in the cache, and determines whether the required texel is present in the texture cache 1970. If it is not, the texture cache manager 1910 sends a request to the memory controller 1950 for the texel. The cache addresses generated by the cache address generator in texture cache manager 1910 are sent the FIFO 1920. As an address is received by the FIFO, a previously received address is output. The FIFO is many addresses deep, for example it maybe 512 addresses deep, such that a received address will be output 512 clock cycles later after 512 other addresses have been received. This latency of 512 clock cycles gives the memory controller time to fetch the required texel, and have it available in the texture cache 1970 when it is required by the texture cache controller 1930 for delivery to the texture filter 1940. This latency of the FIFO is what allows a miss in the texture cache 1970 to occur without slowing the processing of pixel data for the on-screen image.

A simplification can be made to the addressing information stored in the FIFO by recognizing that the four texels, a quad, required by the texture filter 1940 are adjacent to each other in the main memory 1960, and therefore have a relationship to each other in the texture cache 1970 as well. Specifically, each texel quad may be stored in one of four ways as shown in FIG. 20.

Figure 20:
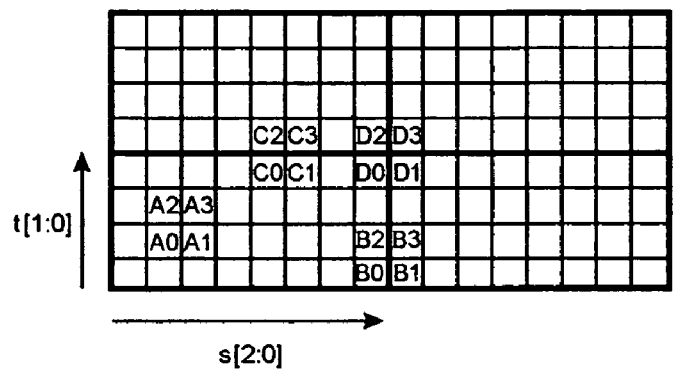
FIG. 20 shows four arrangements of storage of a texel quad in a texel cache.

FIG. 20 illustrates four cache lines 2000, 2001, 2002, and 2003. Texel location in each cache line is determined by the value of the offset signal, which is made up of the two LSBs of the t coordinate t[1:0], and the three LSBs of the s coordinate s[2:0]. A texel quad may be stored entirely within a cache line, such as A0–A3 in cache line 2000. A texel quad may alternately be stored in two cache lines as are B0–B3 and C0–C3, or 4 cache lines, as are D0–D3.

In one embodiment of the present invention, two texel quads, one from each of two cache lines, are accessed each clock cycle. Two address generators are used, each generating one address per clock cycle. Alternately, one, three, four, or more address generators may be used. When texel quad A is needed, one address generator will generate the appropriate address, and the texels will be retrieved. In the same clock cycle, the other address generator may specify the address for a different required texel quad, or simply idle, depending on exact implementation. When texel quad B is required, one address generator will output the address which specifies the texel quad containing B0 and B2, while the other address generator will output the address which specifies the texel quad containing B1 and B3. In this way, the texel quad B can be retrieved in one clock cycle. Alternately, the quads may be accessed in the other clock cycles, depending on the exact implementation.

In this system it takes two clock cycles to retrieve texel quad D from cache. As an example, in the first clock cycle the texel quad containing D0 is addressed by the first address generator, and the texel quad containing D1 is addressed by a second generator. In the second clock cycle, the texel quad containing D2 is addressed by the first address generator, and the texel quad containing D3 is addressed by a second generator. Alternately, the texel quads may be addressed by the other address generator, or in the other clock cycle. In a further embodiment of the present invention, four address generators are used. In this case, each of the four texel quads containing D0, D1, D2 and D3 are addressed by one of the address generators in just one clock cycle.

A further complication to the storage of these texels quads in cache is that the first texel may be stored at either the top or right hand side of the texture. If this happens, the texel quad must wrap around to either the bottom or left hand side of texture, depending on the size of the texture stored in cache.

Figure 21:
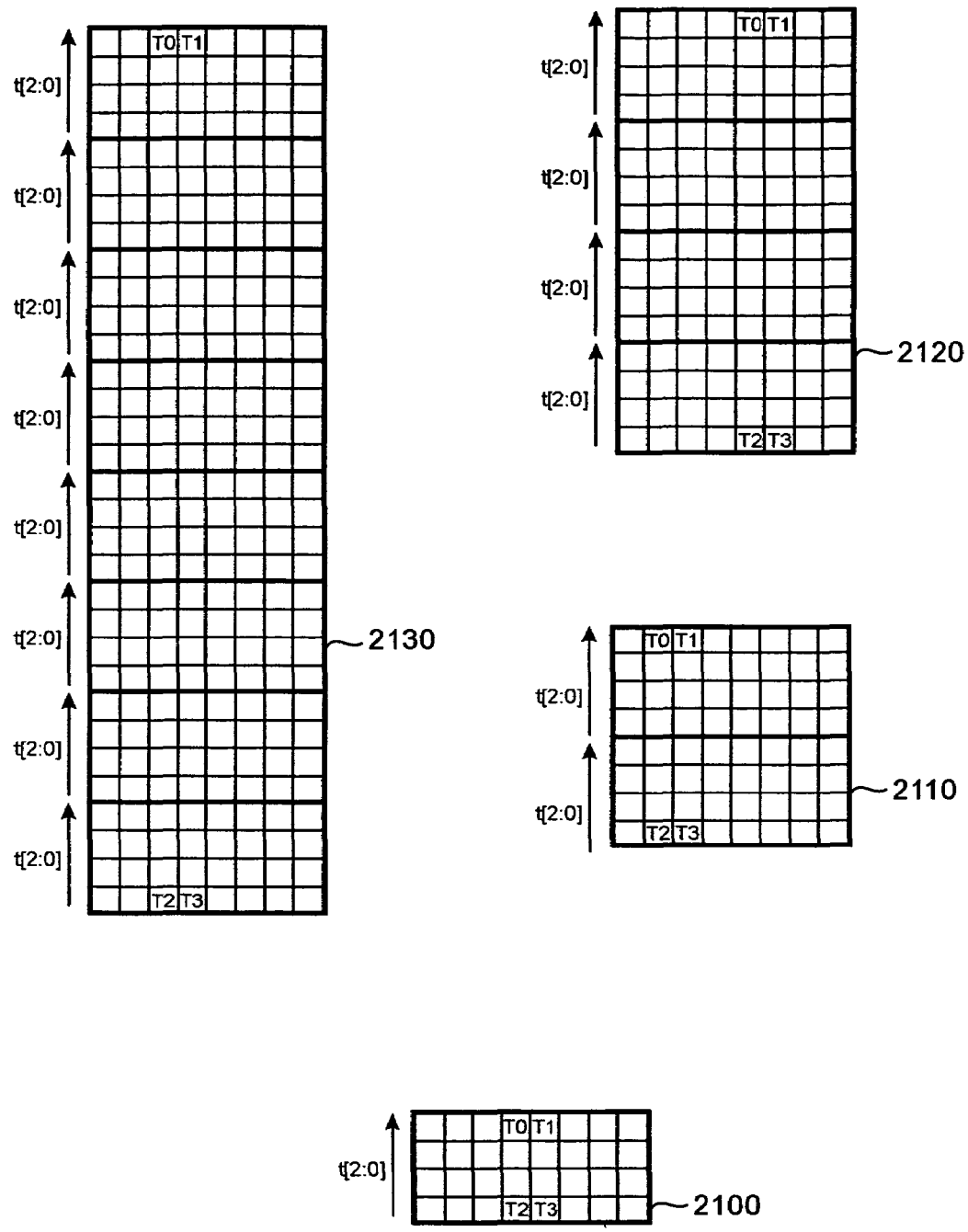
FIG. 21 illustrates four vertical wrap modes supported by one embodiment of the present invention.

FIG. 21 shows four vertical wrap modes which are supported by one embodiment of the present invention. Cache line 2100 illustrates how texels are wrapped in the vertical direction for small textures of a height of 4 texels or less. In this case, a first texel T0 was placed in the top row of texels in cache line 2100. T1 was placed to its right. T2 could be placed above T0, but that would go into the next cache line. Alternately, a wrapping of the texture is supported, and T2 and T3 are placed as indicated. Similarly, texel quads in textures between 5 and 8 texels high can be wrapped as in cache lines 2110. Texel quads in textures between 16 and 9 texels high can be wrapped as in cache lines 2120; those in textures greater than 17 texels are shown in lines 2130.

Figure 22:
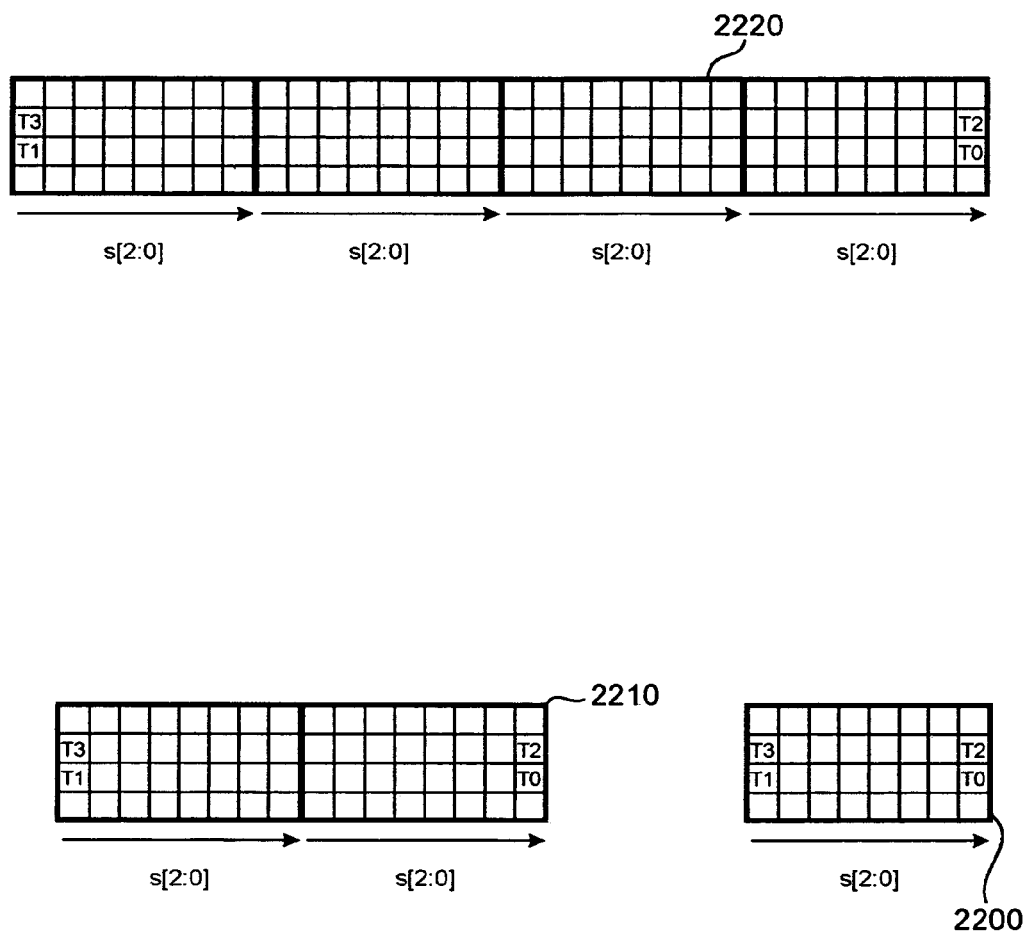
FIG. 22 shows three horizontal wrap modes supported by one embodiment of the present invention.

FIG. 22 shows the same wrapping concept applied in the horizontal direction. Texel quads for textures less than 8, 16, and 32 are shown wrapped in cache lines 2200, 2210, and 2220 respectively.

Returning to FIG. 19, it can now be seen that the way in which the texel quads are stored in the cache can be used to reduce the complexity of the addresses stored in the FIFO 1920. Specifically, there is no need to store the addresses of all four texels in the texel quad in the FIFO, rather only the starting texel, along with additional bits indicating the way in which the texel quad was stored in cache need to be given. This reduction in the amount of information required to be kept in the FIFO reduces the size and cost of the FIFO for a given FIFO depth.

Figure 23:
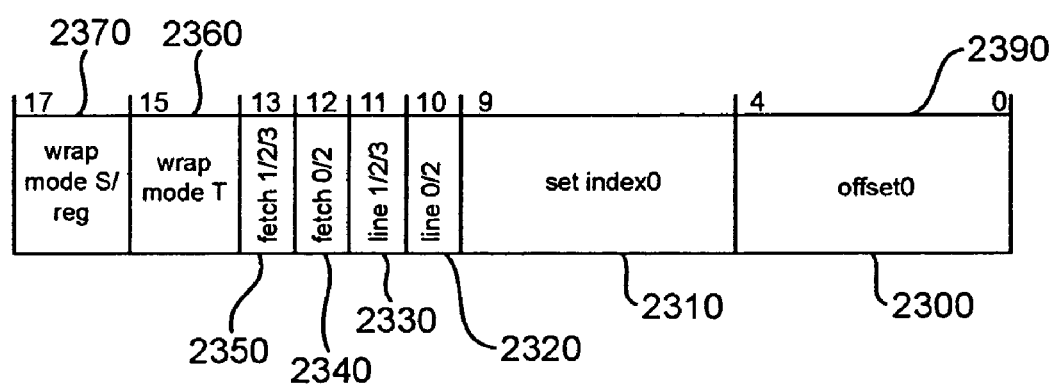
FIG. 23 is illustrative of a packet sent to a FIFO by a cache manager in one embodiment of the present invention.

FIG. 23 illustrates a packet 2390 sent to the FIFO which contains the information required to regenerate a texel quad from the texel cache. Packet 2390 includes the offset 2300, and index 2310 for the first texel of the texel quad. One embodiment of the present invention has a five bit offset 2300 and a five bit index 2310. A line 0/2 (2320) signal is used to indicate the line index for texel 0 in the A type texel quad as shown in FIG. 20, or texel 2 for a D type. A bit Line 1/2/3 (2340) is used to indicate the line index for texel 1, 2, or 3, in types B, C, and D respectively. Similarly, bits fetch 0/2 and fetch 1/2/3 are used to indicate whether the above cache lines need to be fetched from the main memory. The wrap mode T, 2360 is used to provide information to the texture cache controller regarding the vertical wrap mode, as was shown in FIG. 21. Since there are 4 vertical wrap modes, two bits are required. Similarly, wrap mode S 2370 specifies which of the three horizontal wrap modes were used. Since two bits are used for wrap mode S 2370, there is an extra state which may be used for a register flag. An additional bit indicating that the texel quad is a type D, may be included. Ds receives this special attention since, as discussed above, type D texel quads require two clock cycles to be retrieved from cache, whereas other texel quads take one cycle. Information in the packet 2390 contains the information needed by the texture cache controller to reconstruct the texel quad for the texel filter. The information in packet 2390 is only 19 bits in this embodiment of the present invention. This is less than half of the 40 bits which would be required by simply storing the offset and index for each of the four bits. Its impact is even more significant when it is considered that 32 bits is a very natural width for the FIFO. Therefore, reducing the number of bits in packet 2390 enables a narrower FIFO to be used, thus reducing the cost of the overall system.

Embodiments of the present invention have been explained with reference to particular examples and figures. Other embodiments will be apparent to those of ordinary skill in the art. Therefore, it is not intended that this invention be limited except as indicated by the claims.

What is claimed is:

1. A method of storing a texel in a texel cache comprising:
    reading a t coordinate of the texel, the t coordinate comprising a plurality of bits;
    reading an s coordinate of the texel, the s coordinate comprising a plurality of bits; and
    forming an offset by concatenating bits of the t coordinate with bits of the s coordinate,
    wherein the texel is associated with a MIPmap having a level of detail comprising a plurality of bits, and further comprising:
    forming an index signal by concatenating middle order bits of the s coordinate, middle level bits of the t coordinate, and at least one bit of the level of detail.

2. The method of claim 1 wherein the forming an offset by concatenating bits of the t coordinate with bits of the s coordinate is done by concatenating lower order bits of the t coordinate with lower order bits of the s coordinate.

3. The method of claim 2 further comprising storing the texel in a texel cache comprising a plurality of cache lines, wherein each cache line comprises a plurality of storage elements.

4. The method of claim 3 further comprising storing the texel in a storage element identified by the offset, the storage element in a cache line, the cache line identified by the index.

5. The method of claim 4 further comprising retrieving the texel from a main memory, wherein the texel has an address in main memory.

6. The method of claim 5 further comprising forming a tag by concatenating high order bits of the s coordinate with high order bits of the t coordinate and bits of the address in main memory, and storing the tag in a look-up table.

7. The method of claim 1 further comprising forming a tag signal by concatenating upper order bits of the s coordinate, upper order bits of the t coordinate, and at least one bit of the level of detail.

8. The method of claim 1 wherein the index signal includes the lowest order bit of the level of detail.

9. The method of claim 8 further comprising forming a tag signal by concatenating upper order bits of the s coordinate, upper order bits of the t coordinate, at least one bit of the level of detail, and at least one bit of the memory address.

10. A graphics processor comprising:
    a texture cache manager, coupled to receive texel addresses and provide packets of data and fetch requests;
    a memory controller coupled to receive the fetch requests from the texture cache manager and provide cache line updates;
    a FIFO coupled to receive the packets of data from the texture cache manager, where the FIFO stores the packets of data for a plurality of clock cycles; and
    a texture cache controller coupled to receive the cache line updates from the memory controller and packets of data from the FIFO,
    wherein the packets of data each comprise an offset of a first texel, an index of a first texel, and information required to generate an offset and an index of a second texel,
    wherein the index of the first texel comprises at least a bit of a level of detail associated with the first texel.

11. The graphics processor of claim 10 wherein the offset of the first texel comprises bits of an s coordinate for the first texel concatenated with bits of a t coordinate for the first texel.

12. The graphics processor of claim 11 wherein the index of the first texel comprises bits of the s coordinate for the first texel concatenated with bits of the t coordinate for the first texel and at least a bit of a level of detail associated with the first texel.

13. The graphics processor of claim 12 wherein the index signal includes the lowest order bit of the level of detail.

14. The graphics processor of claim 10 further comprising a tag memory coupled to store a tag for the first texel.

15. The graphics processor of claim 14 wherein the tag for the first texel comprises higher order bits of the s coordinate for the first texel concatenated with higher order bits for the second texel.

16. The graphics processor of claim 14 wherein the tag for the first texel comprises upper order bits of the s coordinate, upper order bits of the t coordinate, at least one bit of the level of detail, and at least one bit of the memory address.

17. A method of generating a texture cache address comprising:
    receiving an s coordinate and a t coordinate of a texel, wherein the s coordinate and the t coordinate each comprise a plurality of bits;
    using at least one lower order bit of the s and t coordinates as a portion of an offset;
    using at least one middle order bit of the s and t coordinates as a portion of an index;
    using at least one high order bit of the s and t coordinates as a portion of a tag,
    receiving a level of detail associated with the texel, and using a portion of the level of detail as a portion of the index.

18. The method of claim 17 further comprising receiving a memory address, and using a portion of the memory address as a portion of the tag.

19. The method of claim 17 wherein the index signal includes the lowest order bit of the level of detail.

20. The method of claim 17 further comprising using upper order bits of the s coordinate, upper order bits of the t coordinate, at least one bit of the level of detail, and at least one bit of a memory address as the tag.

* * * * *